United States Patent
Lee et al.

(10) Patent No.: US 11,206,653 B2
(45) Date of Patent: Dec. 21, 2021

(54) METHOD FOR PERFORMING MM-BASED NOMA COMMUNICATION AND DEVICE THEREFOR

(71) Applicant: LG ELECTRONICS INC., Seoul (KR)

(72) Inventors: Hojae Lee, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 16/610,487

(22) PCT Filed: May 2, 2017

(86) PCT No.: PCT/KR2017/004680
§ 371 (c)(1),
(2) Date: Nov. 1, 2019

(87) PCT Pub. No.: WO2018/203580
PCT Pub. Date: Nov. 8, 2018

(65) Prior Publication Data
US 2020/0163058 A1 May 21, 2020

(51) Int. Cl.
*H04W 72/04* (2009.01)
*H04B 7/0456* (2017.01)
(Continued)

(52) U.S. Cl.
CPC ........ *H04W 72/042* (2013.01); *H04B 7/0456* (2013.01); *H04L 5/0014* (2013.01);
(Continued)

(58) Field of Classification Search
CPC ............. H04W 72/0446; H04W 88/08; H04W 72/0453; H04W 72/042; H04W 72/082;
(Continued)

(56) References Cited

U.S. PATENT DOCUMENTS

2013/0322398 A1* 12/2013 Jang .................... H04L 1/0026
370/329
2014/0075004 A1* 3/2014 Van Dusen ....... G06F 16/90335
709/223
(Continued)

FOREIGN PATENT DOCUMENTS

WO  2017023011  2/2017

OTHER PUBLICATIONS

European Patent Office Application Serial No. 17908420.7, Search Report dated Dec. 23, 2020, 12 pages.
(Continued)

*Primary Examiner* — Hassan A Phillips
*Assistant Examiner* — Prenell P Jones
(74) *Attorney, Agent, or Firm* — Lee Hong Degerman Kang Waimey

(57) ABSTRACT

A method by which a terminal performs a multi-dimensional modulation (MM)-based non-orthogonal multiple access (NOMA) communication can comprise the steps of: receiving, from a base station, control information indicating a terminal specific codebook for a terminal in a predefined codebook set for an MM-based encoder; and receiving a downlink data channel from the base station on the basis of the indicated terminal specific codebook, or performing MM-based encoding on the basis of the indicated terminal specific codebook and then transmitting an uplink data channel.

12 Claims, 20 Drawing Sheets

(51) Int. Cl.
*H04L 5/00* (2006.01)
*H04W 72/08* (2009.01)

(52) U.S. Cl.
CPC ......... *H04L 5/0062* (2013.01); *H04W 72/044* (2013.01); *H04W 72/082* (2013.01)

(58) Field of Classification Search
CPC .. H04W 72/044; H04L 5/0062; H04L 5/0014; H04B 7/045
See application file for complete search history.

(56) References Cited

U.S. PATENT DOCUMENTS

| | | | |
|---|---|---|---|
| 2014/0086296 A1* | 3/2014 | Badic | H04L 25/03891 375/229 |
| 2014/0140360 A1 | 5/2014 | Nikopour et al. | |
| 2015/0349923 A1* | 12/2015 | Qiao | H04L 25/0246 375/340 |
| 2016/0006515 A1* | 1/2016 | Kojima | H04B 10/508 398/193 |
| 2016/0028459 A1 | 1/2016 | Bayesteh et al. | |
| 2016/0049999 A1 | 2/2016 | Taherzadeh Boroujeni et al. | |
| 2017/0054483 A1 | 2/2017 | Taherzadeh Boroujeni et al. | |
| 2017/0064645 A1* | 3/2017 | Taherzadeh Boroujeni | H04W 52/286 |
| 2017/0141788 A1* | 5/2017 | Khsiba | H04L 25/03242 |
| 2018/0077685 A1* | 3/2018 | Wu | H04W 72/02 |
| 2018/0145855 A1* | 5/2018 | Chaudhuri | H04L 1/004 |
| 2018/0205591 A1* | 7/2018 | Wang | H04J 13/0003 |
| 2019/0222371 A1* | 7/2019 | Sahin | H04L 27/3416 |
| 2019/0260439 A1* | 8/2019 | Wu | H04B 7/0473 |
| 2019/0334676 A1* | 10/2019 | Liu | H04L 5/0094 |
| 2020/0178338 A1* | 6/2020 | Ahn | H04B 7/0695 |

OTHER PUBLICATIONS

Yan, et al., "A Top-down SCMA Codebook Design Scheme Based on Lattice Theory," 2016 IEEE 27th Annual International Symposium on Personal, Indoor and Mobile Radio Communications—(PIMRC): Fundamentals and PHY, Sep. 2016, pp. 1-5, XP033035312, 5 pages.

Nikopour et al., "Sparse Code Multiple Access," 2013 IEEE 24th International Symposium on Personal, Indoor and Mobile Radio Communicatons: Fundamentals and PHY Track, Sep. 2013, pp. 332-336, XP055227113, 5 pages.

PCT International Application No. PCT/KR2017/004680, Written Opinion of the International Searching Authority dated Jan. 25, 2018, 25 pages.

* cited by examiner

METHOD FOR PERFORMING MM-BASED NOMA COMMUNICATION AND DEVICE THEREFOR

CROSS-REFERENCE TO RELATED APPLICATIONS

This application is the National Stage filing under 35 U.S.C. 371 of International Application No. PCT/KR2017/004680, filed on May 2, 2017, the contents of which are all hereby incorporated by reference herein in their entirety.

TECHNICAL FIELD

The present disclosure relates to a wireless communication system, and more particularly, to a method for performing multi-dimensional modulation (MM) based non-orthogonal multiple access (NOMA) communication and device therefor.

BACKGROUND ART

The next-generation 5G system has considered a wireless sensor network (WSN), massive machine type communication (MTC), etc. where a small packet is intermittently transmitted to achieve massive connection/low cost/low power services.

In the case of a massive MTC service, connection density requirements are strictly limited, but data rates and end-to-end (E2E) latency requirements are unrestricted (for example, connection density: up to 200,000/km2, E2E latency: seconds to hours, and downlink/uplink (DL/UL) data rate: typically 1 to 100 kbps).

DISCLOSURE

Technical Problem

An object of the present disclosure is to provide a method of performing, by a user equipment (UE), MM-based NOMA communication.

Another object of the present disclosure is to provide a method of performing, by a base station, MM-based NOMA communication.

Still another object of the present disclosure is to provide a UE for performing MM-based NOMA communication.

A further object of the present disclosure is to provide a base station for performing MM-based NOMA communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of performing, by a UE, MM-based NOMA communication. The method may include: receiving, from a base station, control information indicating a UE-specific codebook for the UE in a codebook set predefined for an MM-based encoder; and receiving a downlink data channel from the base station based on the indicated UE-specific codebook or transmitting an uplink data channel after performing MM-based encoding based on the indicated UE-specific codebook. The predefined codebook set may be configured such that interference from multiple UEs caused by superposition access of the multiple UEs is minimized. The predefined codebook set may be configured such that when the base station performs decoding, complexity of a message passing algorithm (MPA) is minimized. The indicated UE-specific codebook may be configured such that a Euclidean distance between complex column vectors in the indicated UE-specific codebook is maximized. The control information may be received through a downlink control channel, radio resource control (RRC) signaling, or periodic control signaling. The control information may further include information on a modulation and coding scheme (MCS) index.

In another aspect of the present disclosure, provided herein is a method of performing, by a base station, MM-based NOMA communication. The method may include: selecting a UE-specific codebook for a UE from a codebook set predefined for an MM-based encoder and performing MM-based encoding of channel-coded bits based on the selected UE-specific codebook; and transmitting, to the UE, control information including information indicating the selected UE-specific codebook, wherein the MM-based encoding is applied to the control information; and transmitting, to the UE, a downlink data channel based on the indicated UE-specific codebook or receiving, from the UE, an uplink data channel to which the MM-based encoding is applied based on the indicated UE-specific codebook.

In still another aspect of the present disclosure, provided herein is a UE for performing MM-based NOMA communication. The UE may include a receiver, a transmitter, and a processor. The processor may be configured to: control the receiver to receive, from a base station, control information indicating a UE-specific codebook for the UE in a codebook set predefined for an MM-based encoder; and control the receiver to receive a downlink data channel from the base station based on the indicated UE-specific codebook or control the transmitter to transmit an uplink data channel after performing MM-based encoding based on the indicated UE-specific codebook. The predefined codebook set may be configured such that interference from multiple UEs caused by superposition access of the multiple UEs is minimized. The predefined codebook set may be configured such that when the base station performs decoding, complexity of an MPA is minimized. The indicated UE-specific codebook may be configured such that a Euclidean distance between complex column vectors in the indicated UE-specific codebook is maximized. The control information may be received through a downlink control channel, RRC signaling, or periodic control signaling. The control information may further include information on an MCS index.

In a further aspect of the present disclosure, provided is a base station for performing MM-based NOMA communication. The base station may include: a processor configured to select a UE-specific codebook for a UE from a codebook set predefined for an MM-based encoder and perform MM-based encoding of channel-coded bits based on the selected UE-specific codebook; a transmitter configured to transmit, to the UE, control information including information indicating the selected UE-specific codebook, wherein the MM-based encoding is applied to the control information; and a receiver configured to transmit, to the UE, a downlink data channel based on the indicated UE-specific codebook or receive, from the UE, an uplink data channel to which the MM-based encoding is applied based on the indicated UE-specific codebook.

Advantageous Effects

According to the present disclosure, when a UE-specific codebook is used, a receiving end can reduce not only the complexity of decoding but interference caused by multiuser superposition transmission so that communication performance can be remarkably improved.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the disclosure and are incorporated in and constitute a part of this specification, illustrate embodiments of the disclosure.

FIG. 23 illustrates signal flow in a contention-based transmission system based on UE-specific codebook allocation, and FIG. 24 illustrates signal flow in a contention-based transmission system based on UE-specific codebook selection.

BEST MODE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present disclosure. And, the use of the specific terminology can be modified into another form within the scope of the technical idea of the present disclosure.

Figure 1:
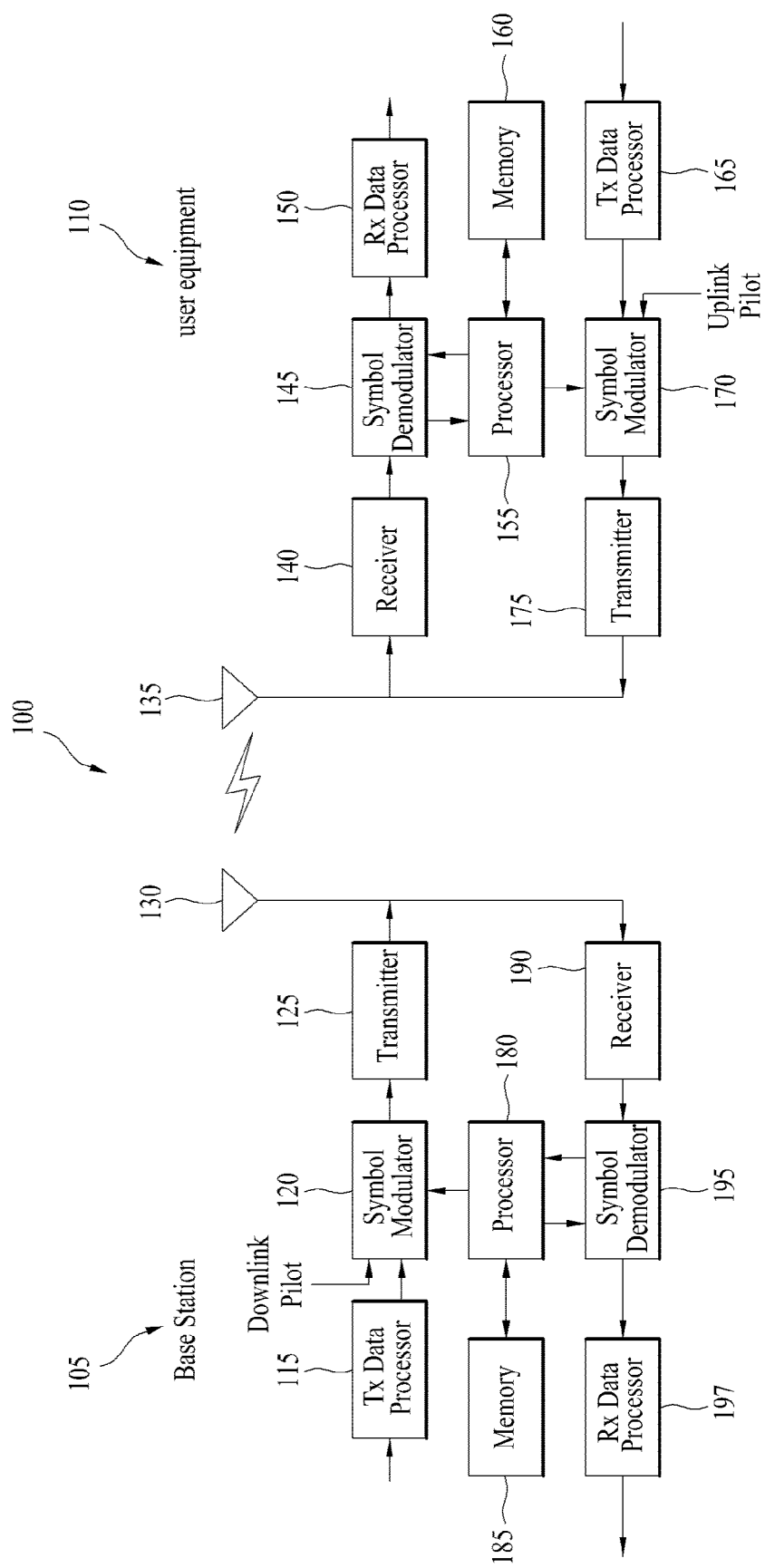
FIG. 1 is a block diagram for configurations of a base station 105 and a user equipment 110 in a wireless communication system 100.

FIG. 1 is a block diagram illustrating the configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135. In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files. The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like. Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

) The present disclosure proposes transmission methods for multiuser superposition access based on non-orthogonal and orthogonal codebooks.

Figure 2:
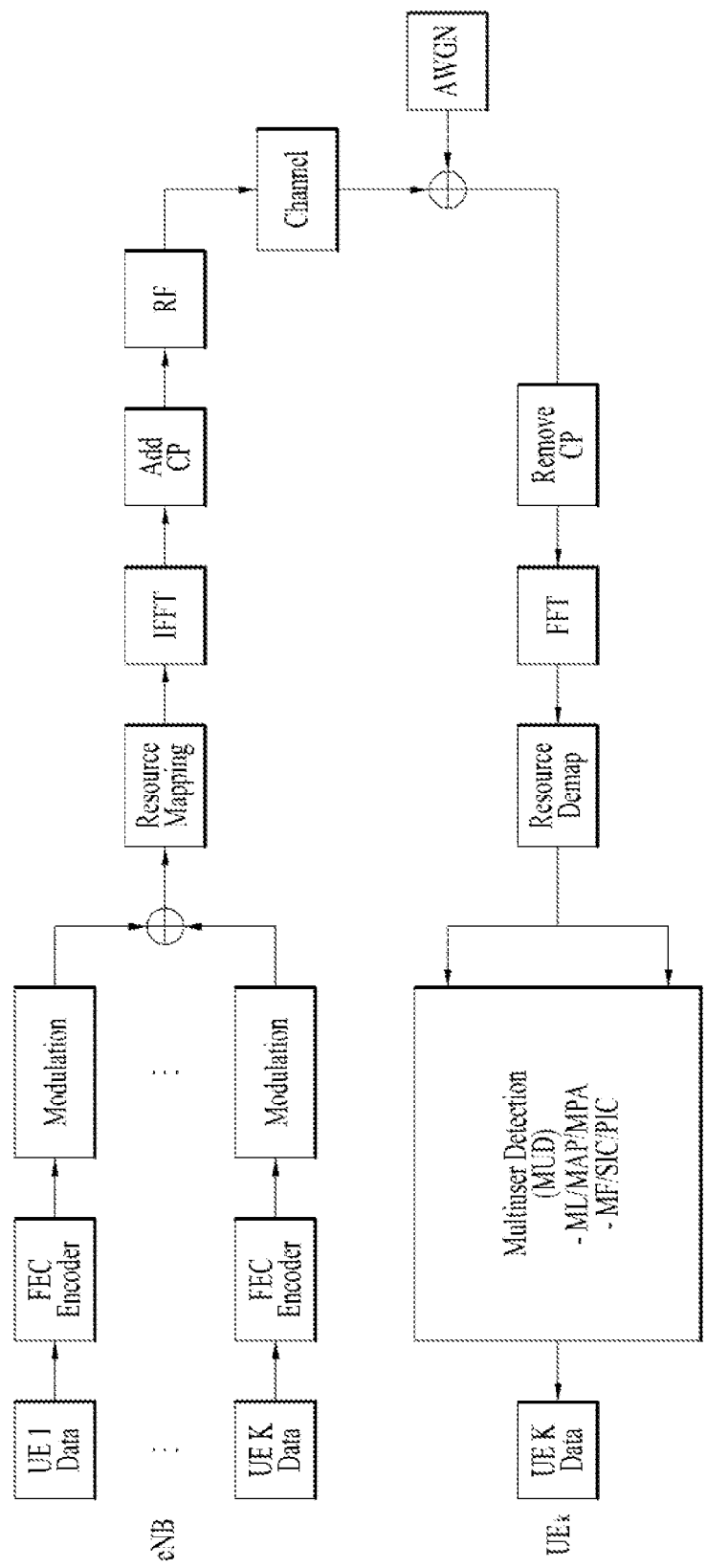
FIG. 2 is a block diagram illustrating NOMA-based downlink transmission/reception (Tx/Rx) between communication devices.

FIG. 2 is a block diagram illustrating NoMA-based downlink transmission/reception (Tx/Rx) between communication devices.

The Tx/Rx structure for downlink support shown in FIG. 2 is generally used in a NOMA system where multiuser information is allocated to the same resource and transmitted thereon. In the 3GPP standardization, the NoMA system is referred to as 'multiuser superposition transmission (MUST) system'. Since information for multiple UEs is superposed and transmitted on the same time-frequency resource in the NOMA system, it can guarantee high transmission capacity and increase the number of simultaneous accesses compared to the legacy LTE system. Thus, the NoMA system is considered as a core technology for the next-generation 5G system. For example, the NOMA-based technology for the next-generation 5G system may include: MUST where UEs are identified based on their power levels; sparse code multiple access (SCMA) where modulation is performed based on a sparse complex codebook; and interleave division multiple access (TDMA) where a UE-specific interleaver is used.

Referring to FIG. 2, in the MUST system, a transmitting end modulates data for multiple UEs and then allocates different power to each symbol. Alternatively, the transmitting end hierarchically modulates the data for multiple UEs based on hierarchical modulation and then transmits the hierarchically modulated data. A receiving end demodulates the data for multiple UEs (hereinafter such data is referred to as multi-UE data) based on multiuser detection (MUD). In the SCMA system, the transmitting end transmits multi-UE data by replacing a forward error correction (FEC) encoder and a modulation procedure for the multi-UE data with a predetermined sparse complex codebook modulation scheme. The receiving end demodulates the multi-UE data based on the MUD.

In the IDMA system, the transmitting end modulates and transmits FEC encoding information for multi-UE data using UE-specific interleavers, and the receiving end demodulates the multi-UE data based on the MUD.

Each of the systems may demodulate multi-UE data using various MUD schemes. For example, the MUD schemes may include maximum likelihood (ML), maximum joint a posteriori probability (MAP), message passing algorithm (MPA), matched filtering (MF), successive interference cancellation (SIC), parallel interference cancellation (PIC), codeword interference cancellation (CWIC), etc. In this case, the demodulation complexity and processing time delay may vary depending on modulation schemes or the number of demodulation attempts.

Figure 3:
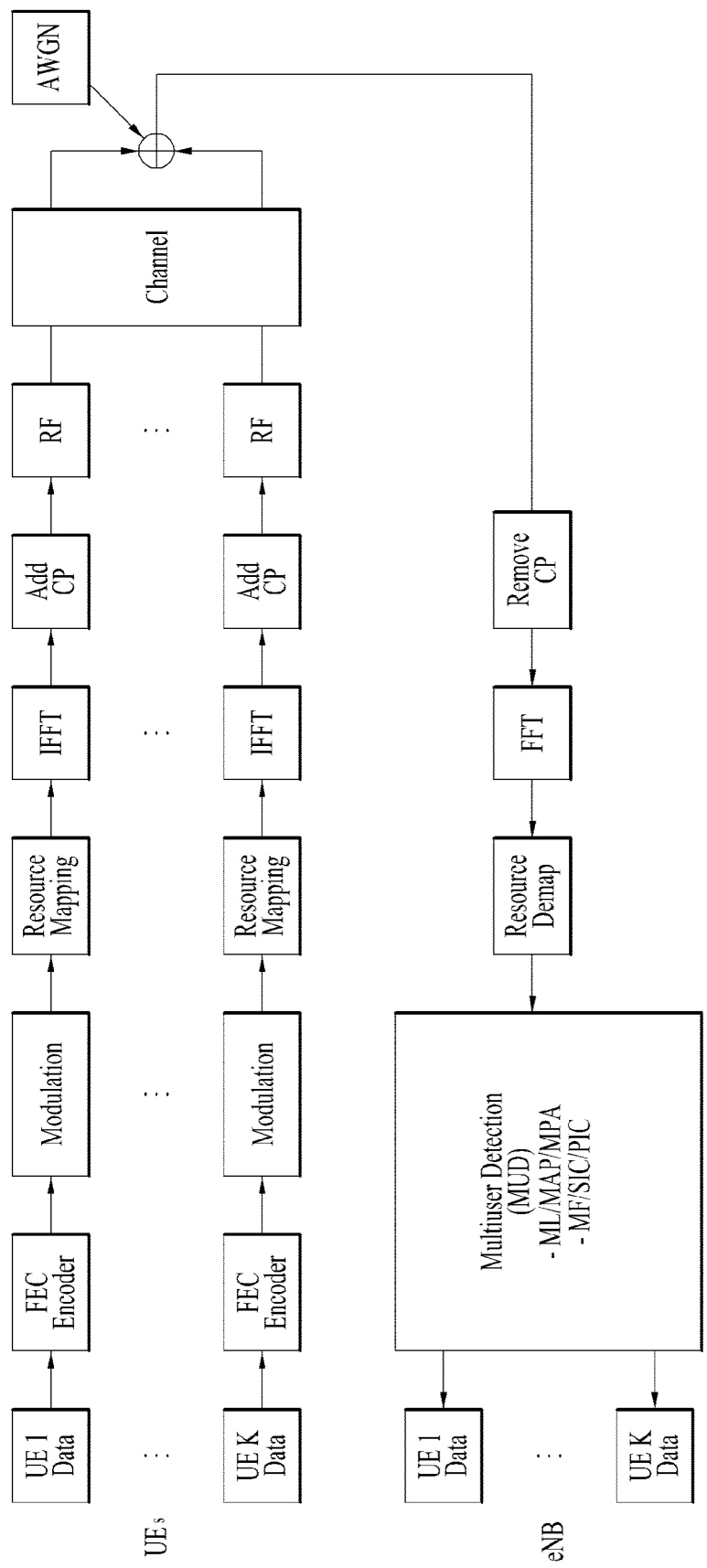
FIG. 3 is a block diagram illustrating NOMA-based uplink Tx/Rx between communication devices.

FIG. 3 is a block diagram illustrating NoMA-based uplink Tx/Rx between communication devices.

Specifically, FIG. 3 shows the Tx/Rx structure for uplink support in a NoMA-based system where information for multiple UEs (hereinafter such information is referred to as multi-UE information) is allocated to the same resource and transmitted thereon. In each of the systems, a transmitting end may transmit multi-UE data in the same manner as described in FIG. 2, and a receiving end may demodulate the multi-UE data in the same manner as described in FIG. 2. Since the NoMA-based system superposes and transmits signals for multiple UEs on the same time-frequency resource, it has a high decoding error rate compared to the LTE system but may support high frequency usage efficiency or large connectivity. In other words, the NoMA system may guarantee high frequency usage efficiency or large connectivity with no increase in the decoding error rate by controlling the coding rate according to system environments.

There is inevitable interference between multi-UE data in the NOMA-based system since the multi-UE data is allocated to the same resource, compared to a case where data is allocated for a single UE. A signal at a kth receiving end in the NOMA-based system in FIG. 2 may be simply expressed as shown in Equation 1, $$y_k = \sum_{n=1}^{K} h_k s_n + n_k = h_k s_k + \sum_{n \neq k, n=1}^{K} h_k s_n + n_k \quad [\text{Equation 1}]$$

In Equation 1, $h_k$ means a channel from the transmitting end to the kth receiving end, $s_k$ means a data symbol to the kth receiving end, and $n_k$ means signal noise. K is the number of multiple UEs allocated to the same time-frequency resource. The second term ($\sum_{n \neq k, n=1}^{K} h_k s_n$) of the third formula of Equation 1 indicates a Multiuser Interference (MUI) signal caused by data symbols to other receiving ends. Therefore, the transmission capacity according to the received signal may be simply expressed as shown in Equation 2 below.

$$C = \sum_{k=1}^{K} R_k \quad [\text{Equation 2}]$$

$$R_k = \log_2\left(1 + \frac{|h_k s_k|^2}{\left|\sum_{n \neq k, n=1}^{K} h_k s_n\right|^2 + \sigma_k}\right) = \log_2\left(1 + \frac{\text{Channel Gain}}{MUI + \text{Noise}}\right),$$

$$\forall k$$

Regarding the transmission capacity in Equation 2, since the number of added $R_k$ values increases as K increases, it is expected that C also increases. However, considering that MUI increases as K increases, each of the $R_k$ values decreases so that the entire transmission capacity C may decrease. Even if a MUD scheme may demodulate data for each UE while effectively decreasing the MUI, the presence of the MUI decreases the entire transmission capacity and requires high-complexity MUD. If the MUI caused by the multi-UE data transmission is minimized, the transmission capacity is expected to be higher. Alternatively, if the MUI caused by the multi-UE data transmission is able to be controlled quantitatively, the transmission capacity may be improved by scheduling superposition between the multi-UE data.

Figure 4:
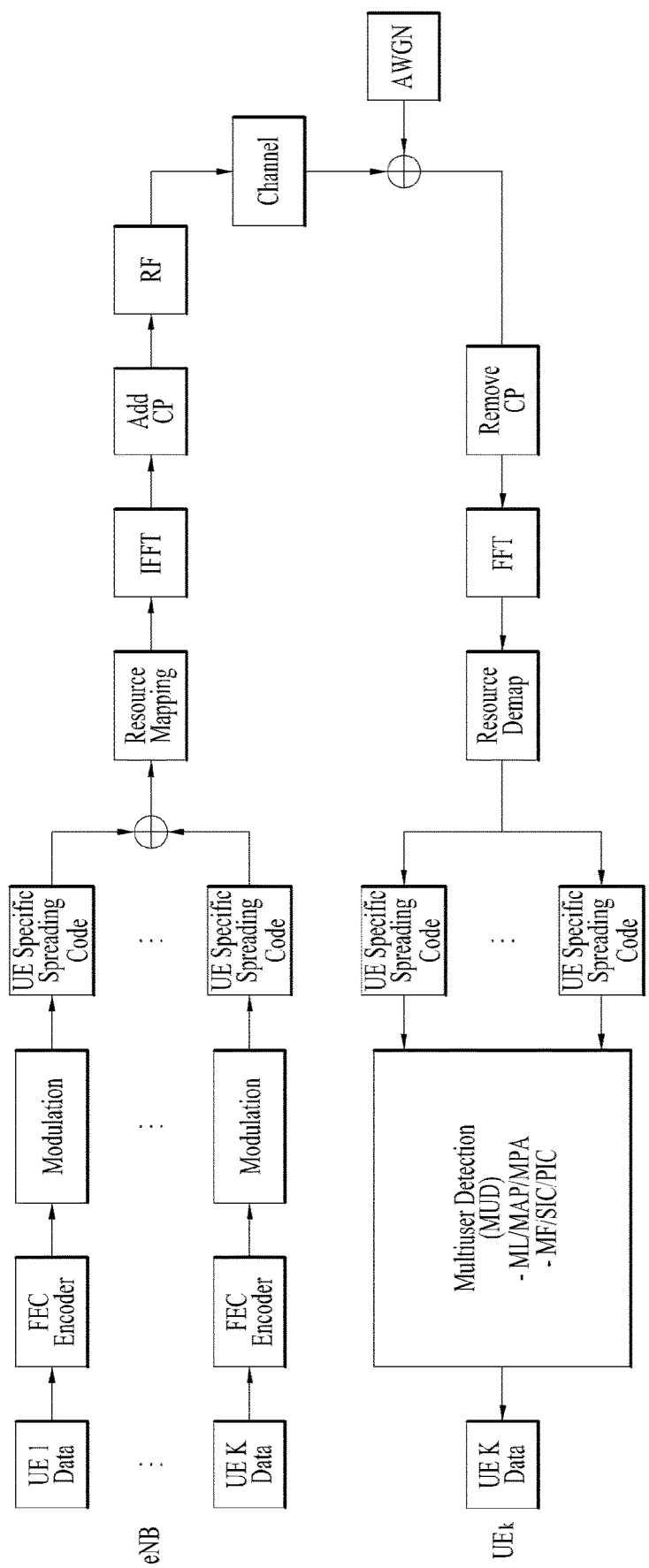
FIG. 4 is a block diagram illustrating downlink Tx/Rx between communication devices based on NOMA and non-orthogonal spreading codes.
Figure 5:
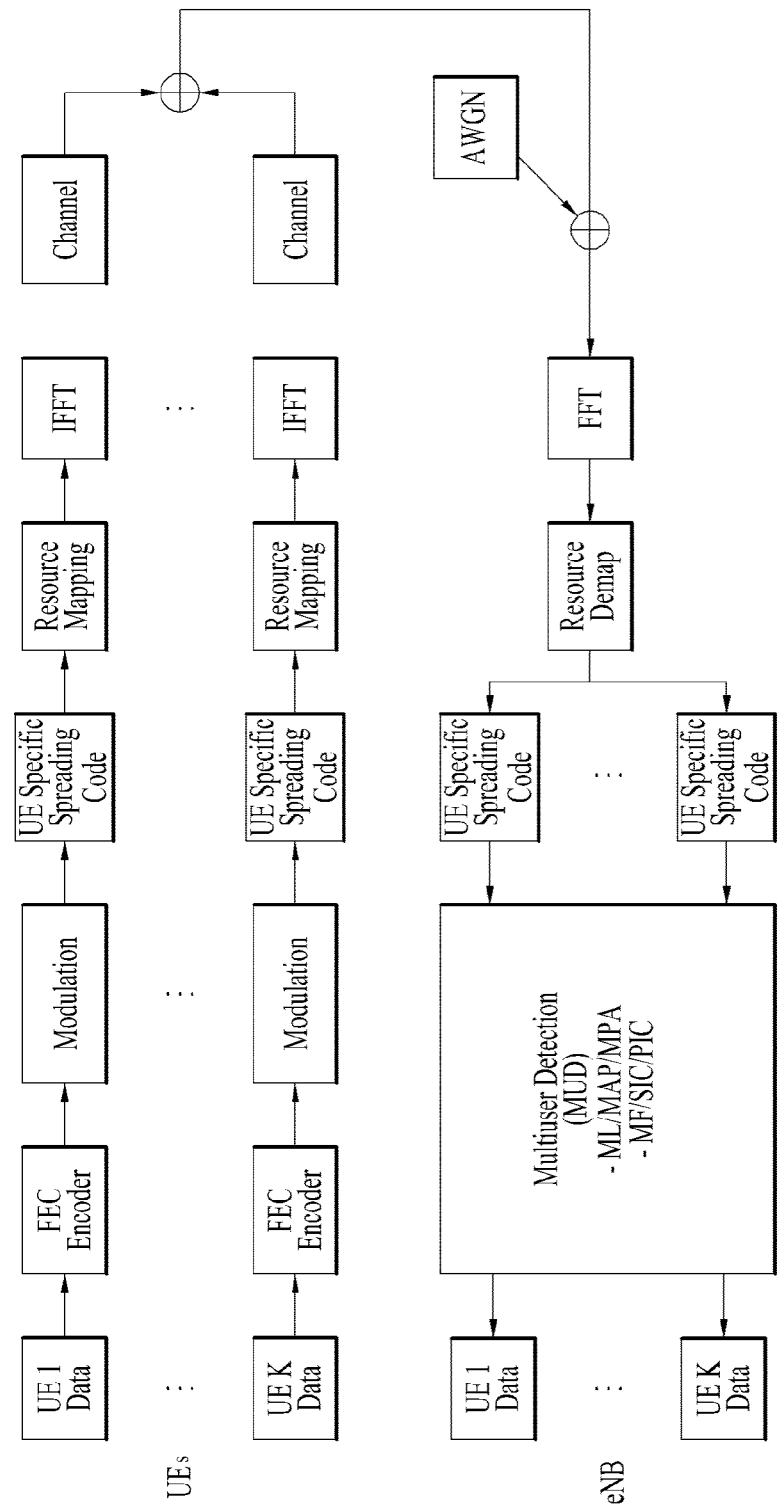
FIG. 5 is a block diagram illustrating uplink Tx/Rx between communication devices based on NOMA and non-orthogonal spreading codes.

FIG. 4 is a block diagram illustrating downlink Tx/Rx between communication devices based on NOMA and non-orthogonal spreading codes, and FIG. 5 is a block diagram illustrating uplink Tx/Rx between communication devices based on NOMA and non-orthogonal spreading codes.

Among NOMA techniques, a non-orthogonal codebook based technique (e.g., SCMA, CDMA, etc.) assumes a multiple access scheme using non-orthogonal spreading codes when multiuser data is superposed and transmitted on the same time-frequency resource through spreading. Specifically, FIG. 4 shows the structures of transmitting and receiving ends for downlink transmission in a NOMA system where multiuser data is superposed and transmitted using UE-specific spreading codes when the multiuser data is allocated to the same time-frequency resource, and FIG. 5 shows the structures of transmitting and receiving ends for uplink transmission in the same NOMA system. Although FIGS. 4 and 5 show that the UE-specific spreading codes are used in the frequency domain, the UE-specific spreading codes may also be used in the time domain.

Using a predefined codebook, each of transmitting and receiving ends allocates a UE-specific spreading code to each user. In this case, the UE-specific spreading code may be expressed as shown in Equation 3.

$$C = [c^{(1)} \ \cdots \ c^{(K)}] = \begin{bmatrix} c_1^{(1)} & \cdots & c_1^{(K)} \\ \vdots & \ddots & \vdots \\ c_N^{(1)} & \cdots & c_N^{(K)} \end{bmatrix} \quad \text{[Equation 3]}$$

A UE-specific spreading codebook is a codebook satisfying the condition of $C \lfloor \mathbb{C}^{N \times K}$ and has the characteristics shown in Equation 4.

Using a predefined codebook, each of transmitting and receiving ends allocates a UE-specific spreading code to each user. In this case, the UE-specific spreading code may be expressed as shown in Equation 4.

$$\begin{cases} |c^{(k)*} \cdot c^{(k)}| = 1, \forall k, k = 1, \ldots, K, \\ |c^{(k)*} \cdot c^{(j)}| = \delta_{kj}, \forall k, \forall j, k \neq j, k = 1, \ldots, K, j = 1, \ldots, K, \end{cases} \quad \text{[Equation 4]}$$

In addition, a NOMA technique capable of spreading an encoded bit stream into complex symbol vectors based on modulation and a non-orthogonal codebook may be considered. This technique corresponds to a multi-dimensional modulation (MM) based NoMA technique, where sparsity may exist or not.

Figure 6:
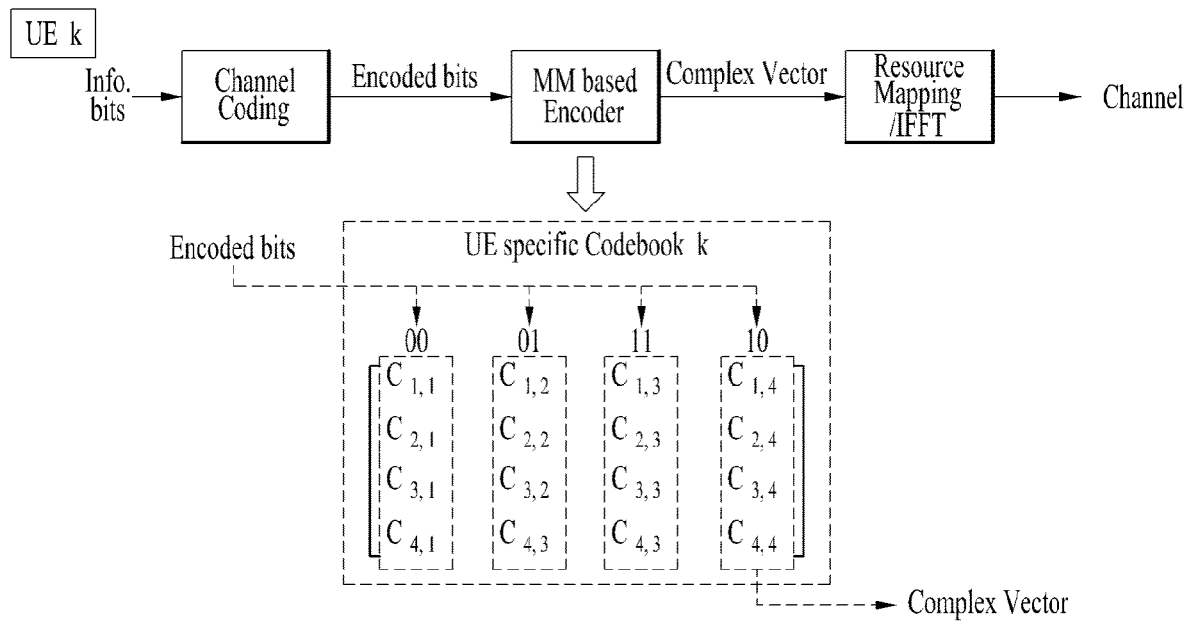
FIG. 6 is a diagram for explaining an MM-based NOMA operation.

FIG. 6 is a diagram for explaining an MM-based NOMA operation.

In the example of FIG. 6, a kth UE (UE k) creates an information bit stream for generated traffic and converts the created information bit stream into an encoded bit stream by performing channel coding thereon. The MM-based encoder of the kth UE (UE k) converts encoded bits into a complex vector based on a UE-specific codebook k. FIG. 6 shows that encoded two bits are converted into a complex vector consisting of four complex symbols. For example, if encoded bits are [0 0], the encoded bits are converted into a complex vector, $[c_{1,1}, c_{2,1}, c_{3,1}, c_{4,1}]^T$. To transmit the converted complex vector, resource mapping and inverse fast Fourier transform (IFFT) are applied. The operation shown in FIG. 6 is applied to downlink transmission in a similar manner, and in this case, a receiving end decodes encoded bits using a message passing algorithm (MPA).

In the operation of FIG. 6, a UE-specific codebook may be applied to a multiuser superposition access scheme based on the characteristics of the codebook. However, when decoding is performed based on the MPA, the coefficients of converted complex vectors of other users may act as interference. Thus, a codebook design capable of minimizing interference from other users is required. The following terms are used herein to explain a relevant process.

J: Cardinality of Codewords (or Expected connected UEs)=The number of Function Nodes (the number of multiple users)

K: Dimension of Codeword (or the number of resources)= The number of Variable Nodes M: Order of Multi-dimensional Modulation (for log 2(M) bits transmission)

$d_v$: Sparsity of Codeword (or the number of Non-zero coefficients)

$d_f$: The number of Superposed coefficients (or the number of UEs connected to the same resource)

OF: Overloading Factor=J/K

In an MM-based NOMA scheme among the NOMA techniques, the design of an MM-based encoder determines the decoding performance of a receiver (or receiving end). However, in the case of the MM-based encoder, there is only an exemplary codebook created by computer simulation, and there is no codebook design rule for designing the MM-based encoder or no codebook optimized therefor. Accordingly, the present disclosure proposes a codebook design method and codebook for optimizing the performance of the MM-based encoder. Further, the present disclosure proposes a method of designing entire codebook sets for UE-specific codebooks for the MM-based encoder in MM-based NOMA communication, an optimized codebook set, and a method of exchanging and signaling information on a codebook.

Embodiment 1: Codebook Design for MM-Based Encoder

The MM-based NOMA codebook should be designed as follows.

(Rule 1) Design of Bipartite Matching Rule for MPA Complexity Reduction

Each coefficient of a UE-specific codebook affects the amount of computation for MPA operation. As the number of zero coefficients increases, the complexity of the MAP operation may decrease.

(Rule 1-1) Complete bipartite matching is defined as follows.

$$F_c = \begin{array}{c} \\ vN_1 \\ \vdots \\ vN_K \end{array} \begin{array}{c} FN_1 \ \cdots \ FN_J \\ \begin{bmatrix} 1 & \cdots & 1 \\ \vdots & \ddots & \vdots \\ 1 & \cdots & 1 \end{bmatrix} \end{array}$$

In this case, $d_v = K$ and $d_f = J$. Considering that the complexity of an MPA is affected by $d_v$ and $d_f$, it is necessary to guarantee decoding performance while reducing $d_v$ (the number of non-zero coefficients) and dr (the number of UEs connected or allocated to the same resource).

For example, when multiuser superposition access is supported for six users (J=6) through four complex coefficients (K=4), a factor graph may be defined as $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix}$$

to reduce the complexity of the MPA. Since $d_v=2$ and $d_f=3$ in the above definition, it is expected that the complexity is reduced compared to complete bipartite matching.

(Rule 1-2) UE 1 creates a UE-specific codebook using the vector corresponding to the first column of the factor graph, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix}.$$

For example, UE-specific codebook 1 is configured by $$F(UE=1) = \begin{bmatrix} 0 \\ 1 \\ 0 \\ 1 \end{bmatrix}.$$

When M (modulation order)=4, the codebook for the MM-based encoder may be designed as follow: UE specific Codebook $$1 = \begin{matrix} & 00 & 01 & 11 & 10 \\ & \begin{bmatrix} 0 & 0 & 0 & 0 \\ c_{2,1} & c_{2,2} & c_{2,3} & c_{2,4} \\ 0 & 0 & 0 & 0 \\ c_{4,1} & c_{4,2} & c_{4,3} & c_{4,4} \end{bmatrix} \end{matrix}.$$

In this case, for example, bits '00', '01', '10', and '10' may indicate the vector corresponding to the first column, the vector corresponding to the second column, the vector corresponding to the third column, and the vector corresponding to the fourth column, respectively.

(Rule 1-3) The MM-based encoder needs to determine a mapping relationship between encoded bits and a complex vector with respect to a distance between complex column vectors in the UE-specific codebook according to the Gray mapping rule. Considering channel coding, the Euclidean distance in the bit domain and the Euclidean distance between complex symbol vectors should be calculated in the same manner to obtain good decoding performance. For example, when the Euclidean distance between column vectors 1 and 4 of the UE-specific codebook is greatest, column vectors 1 and 4 correspond to encoded bits [0 0] and encoded bits [1 1], respectively, and thus, the Euclidean distance in the bit domain may be maximized as well. Similarly, when the Euclidean distance between column vectors 2 and 3 of the UE-specific codebook is greatest, column vectors 2 and 3 correspond to encoded bits [0 1] and encoded bits [1 0], respectively, and thus, the Euclidean distance in the bit domain may be maximized as well.

(Rule 2) Design of Base Constellation for Improving UE-Specific Codebook Decoding Performance of Each User (or UE)

Figure 7:
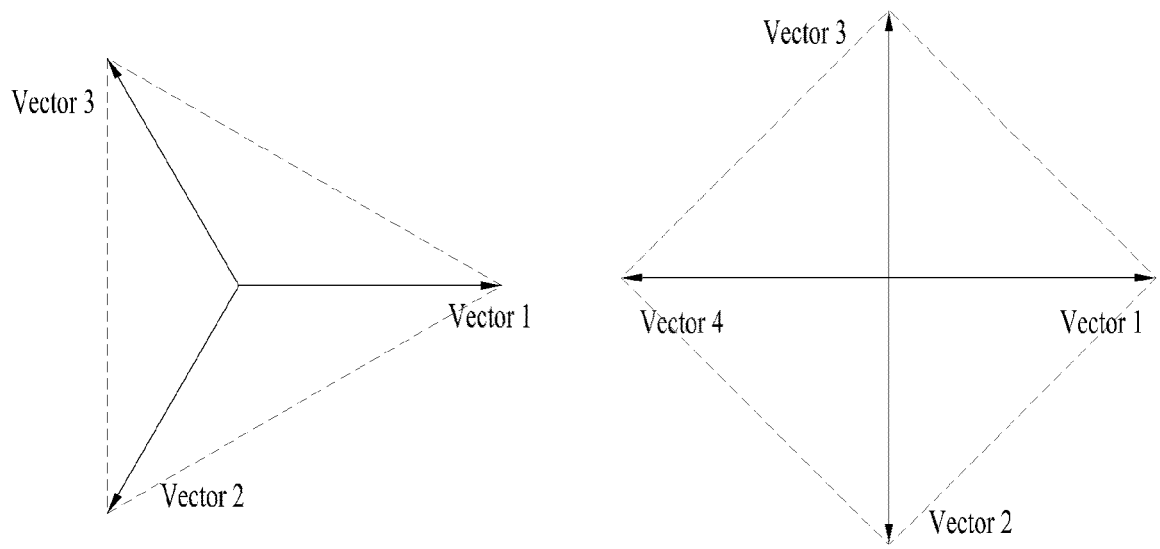
FIG. 7 is a diagram illustrating a case in which there are three or four vectors in a 2-dimensional (2D) plane.

When decoding is performed based on the MPA, detection needs to be performed using a complex vector to decode transmitted encoded bits. Thus, the Euclidean distance between complex vectors in the UE-specific codebook of each user should be maximized. FIG. 7 illustrates a case in which there are three or four vectors in a 2-dimensional (2D) plane.

For example, the condition of max min distance $(c_i, c_j)$, where $i \neq j$, $i, j = 1, \ldots, 4$ needs to be satisfied to maximize the Euclidean distance of UE-specific codebook 1 ($[c_1\ c_2\ c_3\ c_4]$) described in Rule 1. In other words, when vector 1 is orthogonal to vector 2 in a 2D plane and when the phase of vector 1 is opposite to that of vector 4 and the phase of vector 2 is opposite to that of vector 3, the Euclidean distance may be maximized. For example, when UE-specific codebook 1 is $$\begin{bmatrix} 1 & 1 & -1 & -1 \\ -1 & 1 & -1 & 1 \end{bmatrix},$$

the phases of vectors 1 and 2 are opposite to those of vectors 4 and 3, respectively while vector 1 is orthogonal to vector 2. A number of vector sets satisfy this condition and may be combined with other design rules.

(Rule 3) Design of Mother Constellation for Interference Control between Multiple Users Multiple users transmit different complex coefficients according to UE-specific codebooks. As a result, there are $(d_f - 1)$ pieces of interference due to bipartite matching. The Euclidean distance between complex coefficients needs to be maximized to minimize interference and improve the decoding performance of an MPA. For example, considering the factor graph for the bipartite matching described in Rule 1, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

Figure 25:
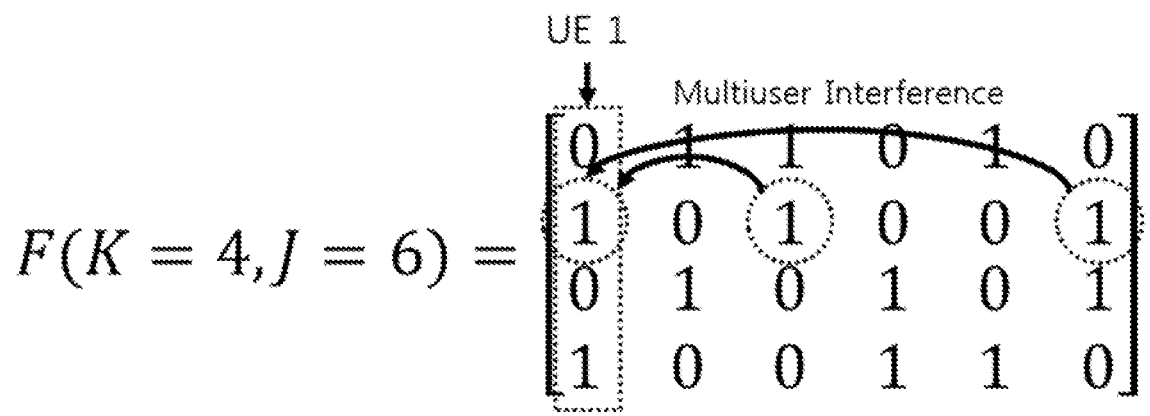
FIG. 25 shows features related to an embodiment of the present invention.

UE 1 creates its UE-specific codebook using the vector corresponding to the first column of the matrix. That is, when the UE-specific codebook is created by $$F(UE=1) = \begin{bmatrix} 0 \\ 1 \\ 0 \\ 1 \end{bmatrix},$$

there is interference from another user having a complex coefficient in the second row. This interference may be expressed as shown in the factor graph for the bipartite matching described in Rule 1 and as shown in FIG. 25.

Therefore, a constellation design for maximizing the Euclidean distance between complex coefficients of each UE-specific codebook of multiuser is required. For example, when $d_f = 3$ and M=4, three UEs transmit a plurality of coefficients on one resource. In this case, since four constellations are configured for each UE according to the value of M, there may be a total of 12 complex coefficients. Assuming that constellations used by UE 1, UE 2, and UE 3 are $[a(1), a(2), a(3), a(4)]$, $[b(1), b(2), b(3), b(4)]$, and $[c(1), c(2), c(3), c(4)]$, respectively, complex symbols superposed on one resource may be represented as follows: superposition of constellations $(i, j, k) = a(i) + b(j) + c(k)$, where $i, j, k = 1, \ldots, M^{d_f}$. Accordingly, the superposition of constellations $(i, j, k)$ may be represented by a total of $M^{d_f}$ ($4^3 = 64$) combinations. To minimize multiuser interference (or decode a superposed signal), a constellation design for maximizing the Euclidean distance between superposed constellations is required.

(Rule 4) Design of Mother Constellation in Consideration of Contention-Based Transmission In Rule 3, superposition transmission is performed according to scheduling so that interference from all users (or UEs) is optimized. However, in the case of contention-based transmission, all users may not perform transmission. In this case, since multiple symbols may not be superposed and transmitted on one resource, the optimization of Euclidean distances in a constellation represented on one resource may affect decoding performance. Therefore, a constellation design needs to consider the optimization of Euclidean distances in the constellation represented on one resource. That is, for the bipartite matching determined in Rule 1, Euclidean distances between all mother constellations used for optimizing Rule 2 are maximized.

(Rule 5) Design of Bipartite Matching Rule Extension for Providing High Connectivity The codebook design of Rule 1 that satisfies Rules 2, 3, and 4 is an NP-hard problem due to non-convex optimization. As a result, it is very difficult to design a codebook as the values of J and K increase. To simplify the codebook design, bipartite matching rule extension is proposed.

It is assumed that in Rule 1, the minimum unit of the bipartite matching, F(K=4, J=6) is designed according to Rule 3. Using the Cartesian product of an identity matrix and F(K=4, J=6), a bipartite matching pattern may be extended as follows:

$$F(K=8, J=12) = F(K=4*2, J=6*2) = I_{2\times 2} \times F(K=4, J=6) = \begin{bmatrix} F(K=4, J=6) & 0 \\ 0 & F(K=4, J=6) \end{bmatrix}.$$

The above equation may be generalized as follows:

$$F(mK, mJ) = I_{m\times m} \times F(K, J) = \begin{bmatrix} F(K,J) & \cdots & 0 \\ \vdots & \ddots & \vdots \\ 0 & \cdots & F(K,J) \end{bmatrix}.$$

The above-described codebook design is an NP-hard problem due to non-convex optimization. As a result, it is very difficult to design an optimized codebook that satisfies all conditions. Accordingly, the present disclosure describes a method of increasing the decoding rate of a multiuser superposition signal through the MPA of a receiving end by relaxing some of the rules with reference to the following embodiments.

Embodiment 1: Optimization of Rules 1 and 2 and Relaxation of Rule 3 (Single Base Constellation Based Codebook Design)

In Embodiment 1, Rule 1 is optimized for the case where $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the case, if this factor graph is changed by a linear combination of each column vector or row vector thereof, its characteristics are not changed. To optimize Rule 2, the following base constellation and phase rotation are proposed.

Figure 8:
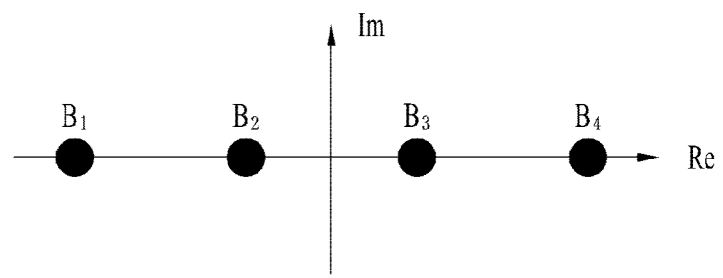
FIG. 8 is a diagram illustrating a single base constellation.

FIG. 8 illustrates a single base constellation.

In FIG. 8, base constellation: B=[B1, B2, B3, B4], where B1=−3, B2=−1, B3=1, and B4=3 and $$\theta_i = \frac{i-1}{d_f} *\pi, \text{ where } i = 1, \ldots d_f.$$

Then, mother constellations may be configured by the base constellation and phase rotation as follows.

Figure 9:
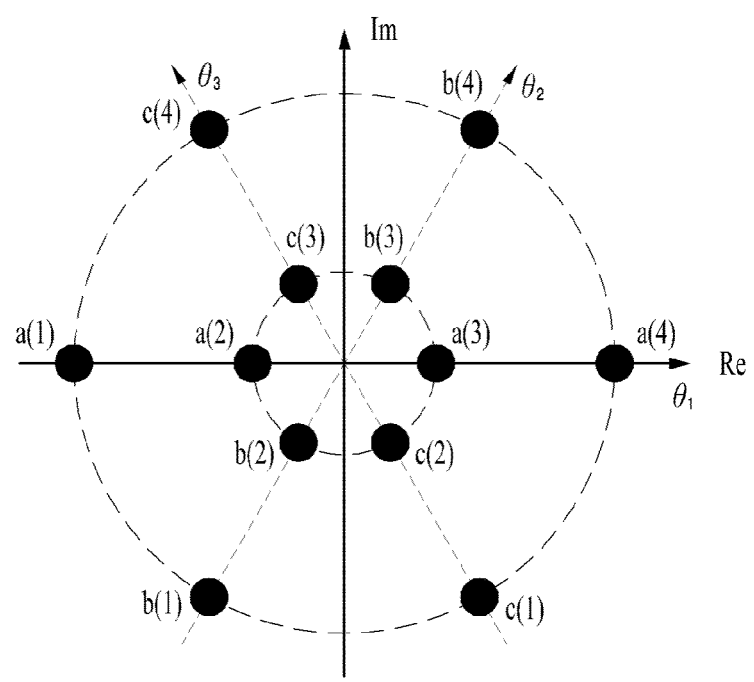
FIG. 9 is a diagram illustrating mother constellations according to FIG. 8.

FIG. 9 illustrates mother constellations according to FIG. 8.

The mother constellations of FIG. 9 may be expressed as follows:

$a=B*\exp(j*\theta_1)=B=[a(1),a(2),a(3),a(4)]$   Mother Constellation 1

$b=B*\exp(j*\theta_2)=B*\exp(j*\frac{1}{3}\pi)=[b(1),b(2),b(3),b(4)]$ Mother Constellation 2

$c=B*\exp(j*\theta_3)=B*\exp(j*\frac{2}{3}\pi)=[c(1),c(2),c(3),c(4)]$ Mother Constellation 3

For the optimization of Rule 2, the constellations may be mapped to the UE-specific codebook of each user as follows.

Since $F(UE=1) = \begin{bmatrix} 0 \\ 1 \\ 0 \\ 1 \end{bmatrix}$, UE specific Codebook 1 = $\begin{bmatrix} 0 \\ P*c^T \\ 0 \\ a \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=2) = \begin{bmatrix} 1 \\ 0 \\ 1 \\ 0 \end{bmatrix}$, UE specific Codebook 2 = $\begin{bmatrix} a \\ 0 \\ P*c^T \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=3) = \begin{bmatrix} 1 \\ 1 \\ 0 \\ 0 \end{bmatrix}$, UE specific Codebook 3 = $\begin{bmatrix} P*b^T \\ a \\ 0 \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=4) = \begin{bmatrix} 0 \\ 0 \\ 1 \\ 1 \end{bmatrix}$, UE specific Codebook 4 = $\begin{bmatrix} 0 \\ 0 \\ b \\ P*c^T \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ -continued Since $F(UE = 5) = \begin{bmatrix} 1 \\ 0 \\ 0 \\ 1 \end{bmatrix}$, UE specific Codebook 5 = $\begin{bmatrix} P*c^T \\ 0 \\ 0 \\ b \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE = 6) = \begin{bmatrix} 0 \\ 1 \\ 1 \\ 0 \end{bmatrix}$, UE specific Codebook 6 = $\begin{bmatrix} 0 \\ P*b^T \\ a \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

To improve the UE-specific codebook decoding performance of each user, the permutation matrix, P maximizes the Euclidean distance between complex vectors in the UE-specific codebook of each user according to Rule 2. For example, assuming that column vectors of UE specific Codebook 1 = $\begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix}$ are vector 1, 2, 3, and 4, respectively, the phases of vectors 1 and 2 are opposite to those of vectors 4 and 3, respectively since c(1)=−c(4), c(2)=−c(3), a(1)=−a(4), and a(2)=−a(3). In addition, since conjugate(c(2))*c(4)+conjugate(a(1))*a(2)=0, vector 1 is orthogonal to vector 2. Since the vector relationship is equally applied to all UE-specific codebooks, Rule 2 is optimized. By substituting the UE-specific codebooks into the factor graph for the bipartite matching obtained from Rule 1, Equation 5 is obtained.

$F(K = 4,$ [Equation 5]

Figure 10:
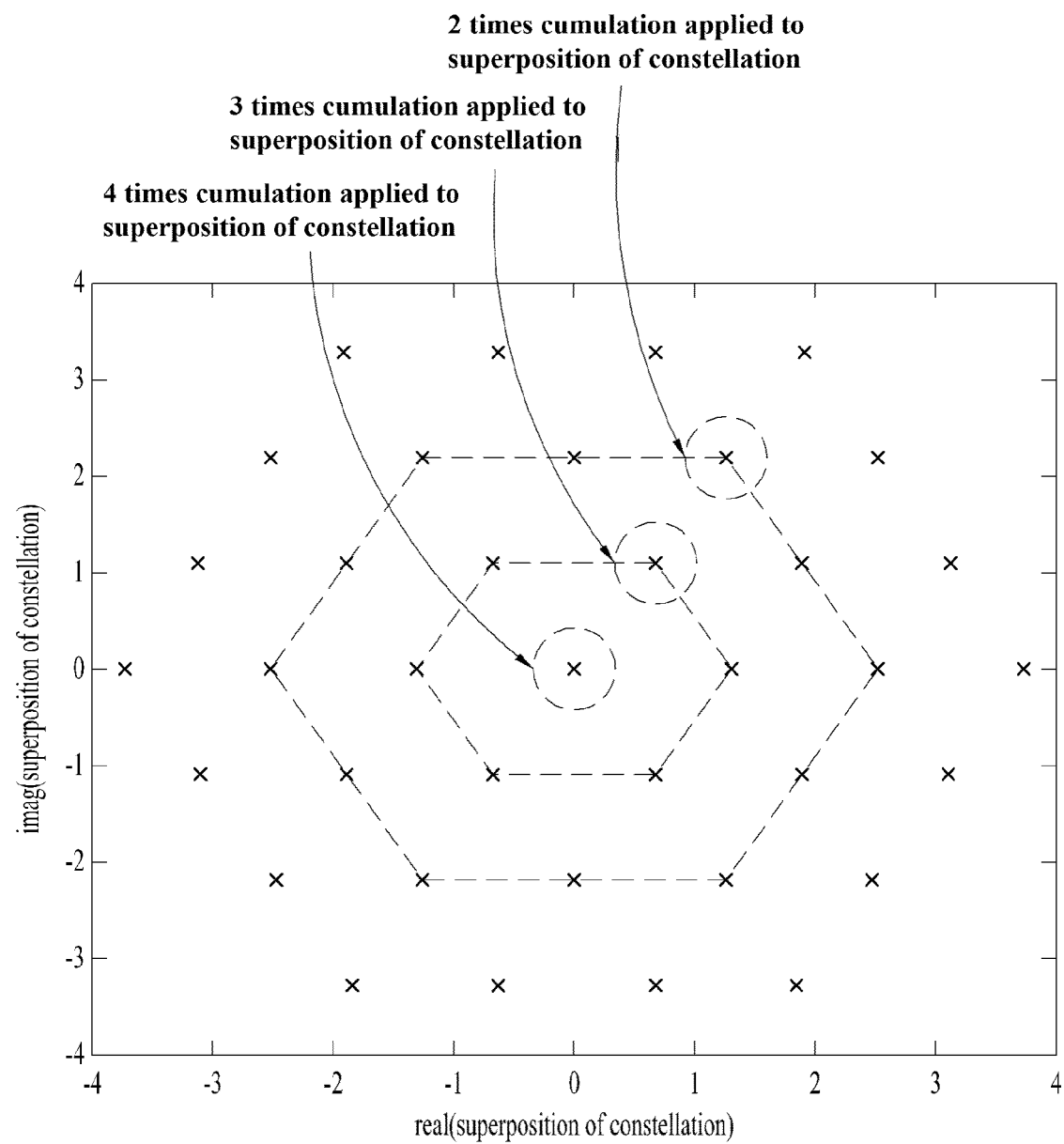
FIG. 10 is a diagram illustrating superposition of constellations.

$J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$ Meanwhile, in Rule 3, the superposition of constellations (i, j, k) may have a total of $M^{df}(4^3=64)$ combinations as shown in FIG. 10.

FIG. 10 illustrates superposition of constellations.

In FIG. 10, the x axis corresponds to the real domain of the constellation superposition, and they axis corresponds to the imaginary domain of the constellation superposition. In FIG. 10, it can be seen from superposition of constellation patterns that some constellations are superposed. That is, Rule 3 may not be optimized depending on combination of traffic of each user. The entire codebook may be expressed as shown in Equation 6.

$F(K = 4, J =$ [Equation 6]

$6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$ $a = [-3, -1, 1, 3],$ $b = [-3, -1, 1, 3]*\exp\left(j*\frac{1}{3}\pi\right),$ $c = [-3, -1, 1, 3]*\exp\left(j*\frac{2}{3}\pi\right),$ $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ UE specific Codebook $k = k^{th}$ column of $F$ matrix $\left( \text{e.g., UE specific Codebook 1} = \right.$ $\left. 1^{st} \text{ column of } F \text{ matrix} = \begin{bmatrix} 0 \\ P*c^T \\ 0 \\ a \end{bmatrix} \right)$ Normalized codebook sets are represented as follows Table 1:

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 1 | $\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$ |
| UE 2 | $\begin{bmatrix} -3 & -1 & 1 & 3 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$ |
| UE 3 | $\begin{bmatrix} -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$ |

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 5 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \end{bmatrix} * P_{no}$ |
| UE 6 | $\begin{bmatrix} 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \end{bmatrix} * P_{no}$ |

NOTE:
$P_{no}$ is (M × M) normalized matrix for the power constraints, $$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Here, $P_{no,m} = (1/|vec\ m|) \times \sqrt{K}$, for m = 1, ..., M, where K = 4, M = 4.

Embodiment 2: Optimization of Rules 1 and 3 and Relaxation of Rule 2 (Multiple Base Constellation Based Codebook Design)

In Embodiment 2, Rule 1 is optimized for the case where $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the case, if this factor graph is changed by a linear combination of each column vector or row vector thereof, its characteristics are not changed. To optimize Rule 3, the following base constellation and phase rotation are proposed.

Figure 11:
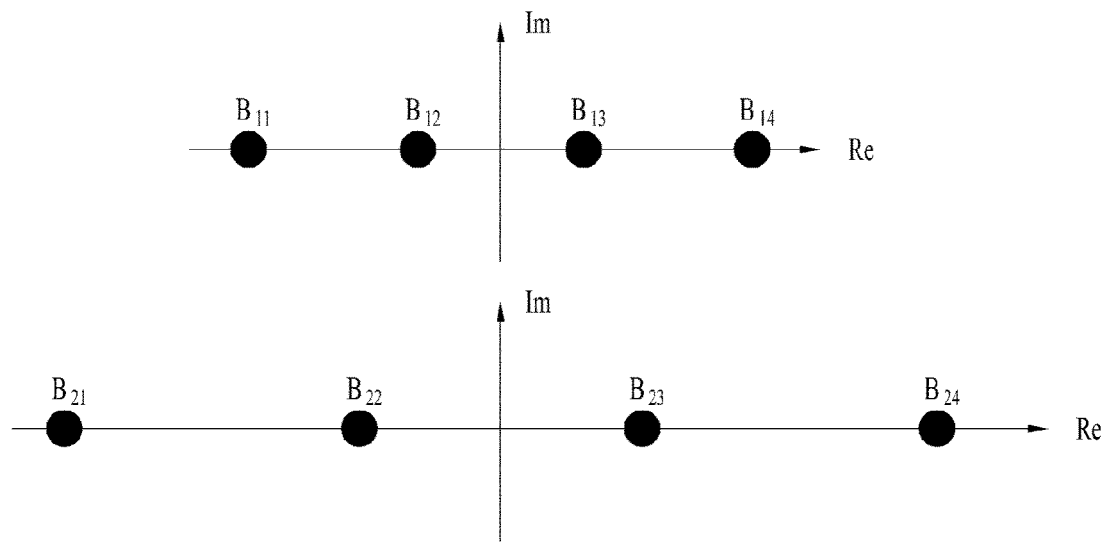
FIG. 11 is a diagram illustrating two base constellations

FIG. 11 illustrates two base constellations.

Referring to FIG. 11, it can be seen as follows:

$B1=[B_{11},B_{12},B_{13},B_{14}]$, where $B_{11}=-3,B_{12}=-1,B_{13}=1,$
$B_{14}=3$   Base Constellation 1

$B2=[B_{21},B_{22},B_{23},B_{24}]$, where $B_{21}=-3*\sqrt{5},B_{22}=-1*\sqrt{5},B_{23}=1*\sqrt{5},B_{24}=3*\sqrt{5}.$ Base Constellation 2

Phase Rotation: $\theta_i = \frac{i-1}{d_f}*\pi$, where $i = 1, ... d_f$.

Figure 12:
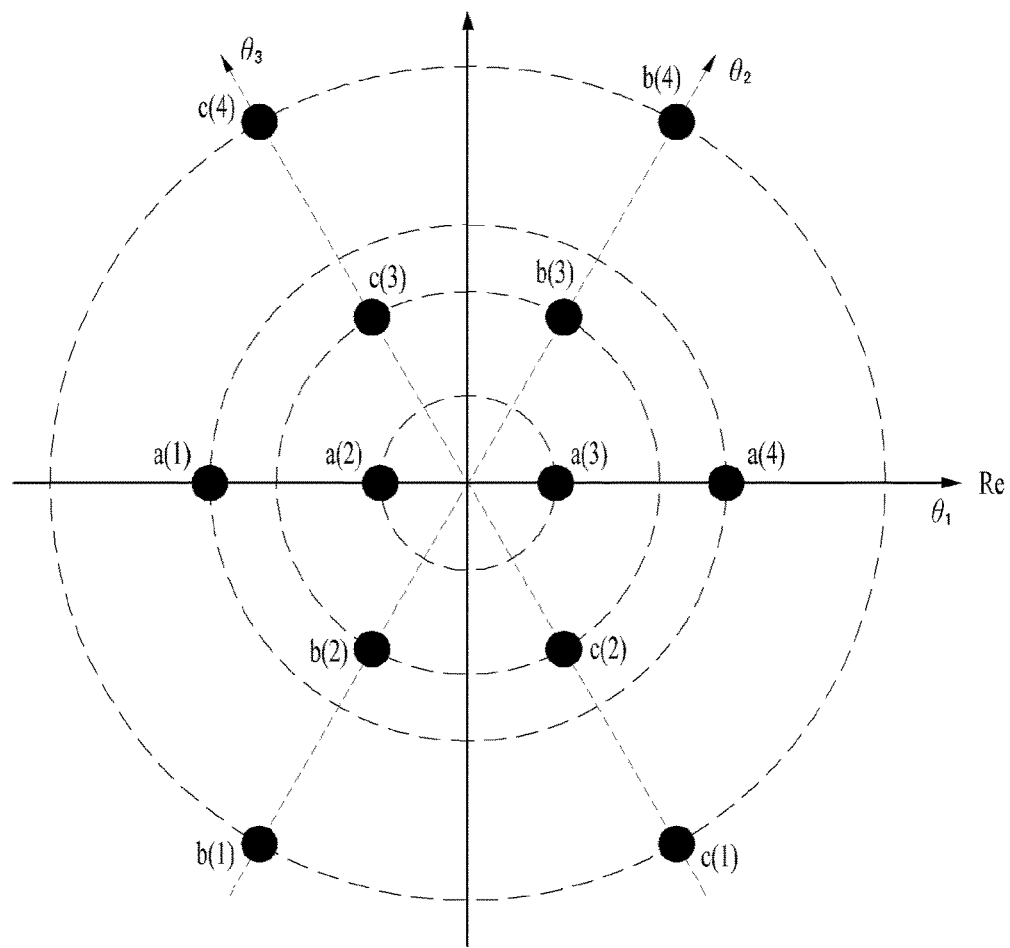
FIG. 12 is a diagram illustrating mother constellations according to FIG. 11.

FIG. 12 illustrates mother constellations according to FIG. 11.

Referring to FIG. 12, mother constellations may be configured by base constellations 1 and 2 and the phase rotation as follows:

$a=B*\exp(j*\theta_1)=B=[a(1),a(2),a(3),a(4)]$   Mother Constellation 1

$b=B*\exp(j*\theta_2)=B*\exp(j*1/3\pi)=[b(1),b(2),b(3),b(4)]$   Mother Constellation 2

$e=B*\exp(j*\theta_3)=B*\exp(j*2/3\pi)=[c(1),c(2),c(3),c(4)].$   Mother Constellation 3

For the optimization of Rule 2, the constellations may be mapped to the UE-specific codebook of each user as follows.

Since $F(UE=1) = \begin{bmatrix} 0 \\ 1 \\ 0 \\ 1 \end{bmatrix}$, UE specific Codebook 1 $= \begin{bmatrix} 0 \\ P*c^T \\ 0 \\ a \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=2) = \begin{bmatrix} 1 \\ 0 \\ 1 \\ 0 \end{bmatrix}$, UE specific Codebook 2 $= \begin{bmatrix} a \\ 0 \\ P*c^T \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=3) = \begin{bmatrix} 1 \\ 1 \\ 0 \\ 0 \end{bmatrix}$, UE specific Codebook 3 $= \begin{bmatrix} P*b^T \\ a \\ 0 \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=4) = \begin{bmatrix} 0 \\ 0 \\ 1 \\ 1 \end{bmatrix}$, UE specific Codebook 4 $= \begin{bmatrix} 0 \\ 0 \\ b \\ P*c^T \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=5) = \begin{bmatrix} 1 \\ 0 \\ 0 \\ 1 \end{bmatrix}$, UE specific Codebook 5 $= \begin{bmatrix} P*c^T \\ 0 \\ 0 \\ b \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=6) = \begin{bmatrix} 0 \\ 1 \\ 1 \\ 0 \end{bmatrix}$, UE specific Codebook 6 $= \begin{bmatrix} 0 \\ P*b^T \\ a \\ 0 \end{bmatrix}$, -continued $$\text{where } P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$$

To improve the UE-specific codebook decoding performance of each user, the permutation matrix, P maximizes the Euclidean distance between complex vectors in the UE-specific codebook of each user according to Rule 2. For example, assuming that column vectors of $$UE \text{ specific Codebook } 1 = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix}$$

are vector 1, 2, 3, and 4, respectively, the phases of vectors 1 and 2 are opposite to those of vectors 4 and 3, respectively since c(1)=−c(4), c(2)=−c(3), a(1)=−a(4), and a(2)=−a(3). However, since conjugate(c(2))*c(4)+conjugate(a(1))*a(2) ≠0 unlike Embodiment 1, vector 1 is non-orthogonal to vector 2. Meanwhile, since conjugate(c(2))*c(4)+conjugate (b(1))*b(2)=0, UE-specific codebooks 5 and 6 are optimized in terms of Rule 2. Regarding Rule 2, UE-specific codebooks 5 and 6 are optimized, but UE-specific codebooks 1 to 4 may not be optimized. Thus, the present disclosure proposes a codebook allocation method where UE-specific codebooks 5 and 6 are first allocated to users, and then remaining UE-specific codebooks 1 to 4 are allocated when NOMA services are provided using the codebooks in uplink. According to this method, the decoding performance of a receiving end may be further improved.

By substituting the UE-specific codebooks into the factor graph for the bipartite matching obtained from Rule 1, Equation 7 is obtained.

$$F(K = 4, \qquad \qquad \text{[Equation 7]}$$

$$J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

Figure 13:
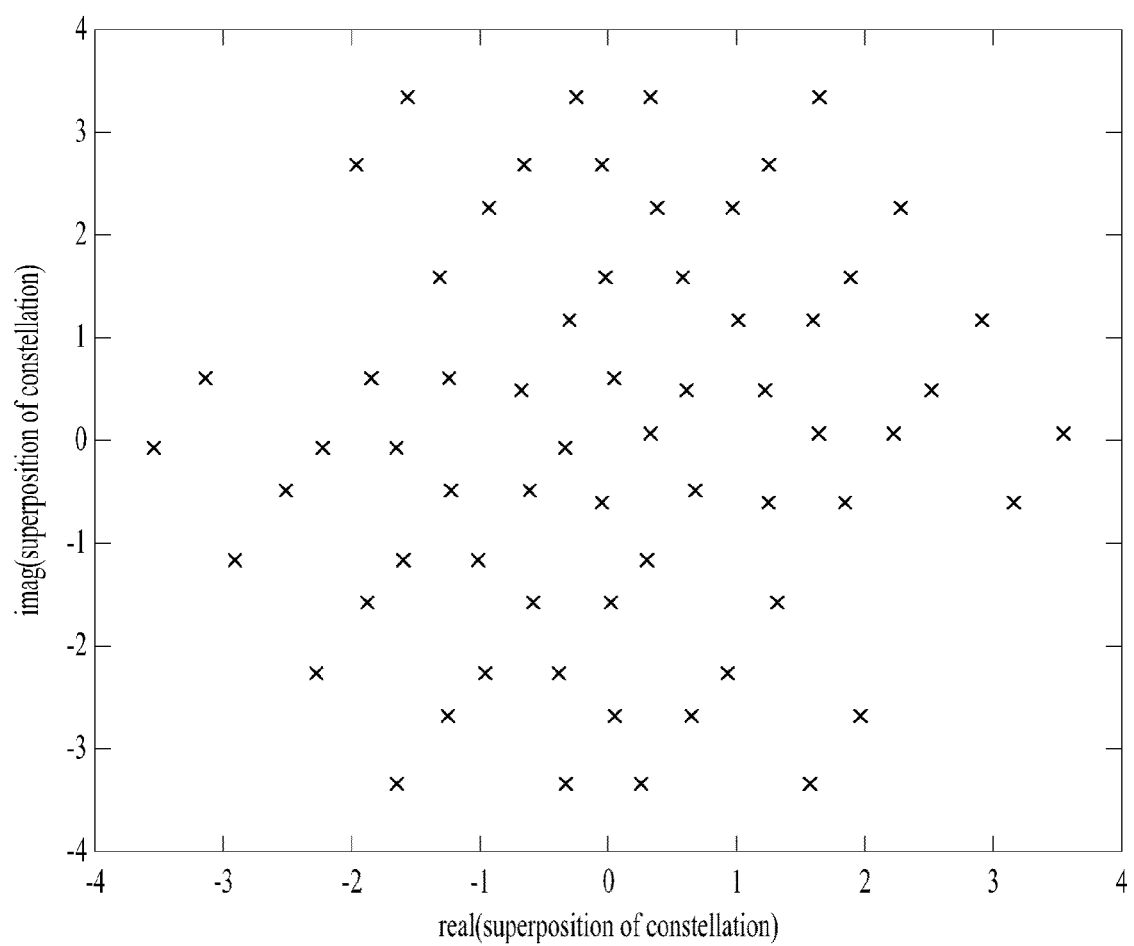
FIG. 13 is a diagram illustrating superposition of constellations

Meanwhile, in Rule 3, the superposition of constellations (i, j, k) may have a total of $M^{d_f}(4^3=64)$ combinations according to the mother constellations and the bipartite matching as shown in FIG. 13.

FIG. 13 illustrates superposition of constellations.

In FIG. 13, the x axis corresponds to the real domain of the constellation superposition, and the y axis corresponds to the imaginary domain of the constellation superposition. In FIG. 13, it can be seen from superposition of constellation patterns that each of the 64 constellations has a predetermined Euclidean distance without superposition. That is, an almost optimized Euclidean distance may be designed in Rule 3 regardless combination of traffic of each user. The entire codebook may be summarized as shown in Equation 8.

$$F(K = 4, J = \qquad \qquad \text{[Equation 8]}$$

$$6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = [-3, -1, 1, 3],$$

$$b = [-3*\sqrt{5}, -1*\sqrt{5}, 1*\sqrt{5}, 3*\sqrt{5}]*\exp\left(j*\frac{3}{2}\pi\right),$$

$$c = [-3*\sqrt{5}, -1*\sqrt{5}, 1*\sqrt{5}, 3*\sqrt{5}]*\exp\left(j*\frac{2}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook $k = k^{th}$ column of $F$ matrix $\Big($ e.g., UE specific Codebook 1 =

$$1^{st} \text{ column of } F \text{ matrix} = \begin{bmatrix} 0 \\ P*c^T \\ 0 \\ a \end{bmatrix}\Big)$$

Normalized codebook sets are represented as follows.

| UE index k | UE specific Codebook $k = \begin{matrix} 00 & 01 & 10 & 11 \\ [vec\ 1 & vec\ 2 & vec\ 3 & vec\ 4] \end{matrix}*P_{no}$ | | | |
|---|---|---|---|---|
| UE 1 | $\begin{bmatrix} 0 \\ -\sqrt{5}*e^{j*\frac{2}{3}\pi} \\ 0 \\ -3 \end{bmatrix}$ | $\begin{matrix} 0 \\ 3\sqrt{5}*e^{j*\frac{2}{3}\pi} \\ 0 \\ -1 \end{matrix}$ | $\begin{matrix} 0 \\ -3\sqrt{5}*e^{j*\frac{2}{3}\pi} \\ 0 \\ 1 \end{matrix}$ | $\begin{matrix} 0 \\ \sqrt{5}*e^{j*\frac{2}{3}\pi} \\ 0 \\ 3 \end{matrix} *P_{no}$ |
| UE 2 | $\begin{bmatrix} -3 \\ 0 \\ -\sqrt{5}*e^{j*\frac{2}{3}\pi} \\ 0 \end{bmatrix}$ | $\begin{matrix} -1 \\ 0 \\ 3\sqrt{5}*e^{j*\frac{2}{3}\pi} \\ 0 \end{matrix}$ | $\begin{matrix} 1 \\ 0 \\ -3\sqrt{5}*e^{j*\frac{2}{3}\pi} \\ 0 \end{matrix}$ | $\begin{matrix} 3 \\ 0 \\ \sqrt{5}*e^{j*\frac{2}{3}\pi} \\ 0 \end{matrix} *P_{no}$ |
| UE 3 | $\begin{bmatrix} -\sqrt{5}*e^{j*\frac{1}{3}\pi} \\ -3 \\ 0 \\ 0 \end{bmatrix}$ | $\begin{matrix} 3\sqrt{5}*e^{j*\frac{1}{3}\pi} \\ -1 \\ 0 \\ 0 \end{matrix}$ | $\begin{matrix} -3\sqrt{5}*e^{j*\frac{1}{3}\pi} \\ 1 \\ 0 \\ 0 \end{matrix}$ | $\begin{matrix} \sqrt{5}*e^{j*\frac{1}{3}\pi} \\ 3 \\ 0 \\ 0 \end{matrix} *P_{no}$ |
| UE 4 | $\begin{bmatrix} 0 \\ 0 \\ -3\sqrt{5}*e^{j*\frac{1}{3}\pi} \\ -\sqrt{5}*e^{j*\frac{2}{3}\pi} \end{bmatrix}$ | $\begin{matrix} 0 \\ 0 \\ -\sqrt{5}*e^{j*\frac{1}{3}\pi} \\ 3\sqrt{5}*e^{j*\frac{2}{3}\pi} \end{matrix}$ | $\begin{matrix} 0 \\ 0 \\ \sqrt{5}*e^{j*\frac{1}{3}\pi} \\ -3\sqrt{5}*e^{j*\frac{2}{3}\pi} \end{matrix}$ | $\begin{matrix} 0 \\ 0 \\ 3\sqrt{5}*e^{j*\frac{1}{3}\pi} \\ \sqrt{5}*e^{j*\frac{2}{3}\pi} \end{matrix} *P_{no}$ |

-continued

| UE index k | UE specific Codebook $k = \begin{matrix} 00 & 01 & 10 & 11 \\ [vec\ 1 & vec\ 2 & vec\ 3 & vec\ 4] * P_{no} \end{matrix}$ |
|---|---|
| UE 5 | $\begin{bmatrix} -\sqrt{5}*e^{j*\frac{2}{3}\pi} & 3\sqrt{5}*e^{j*\frac{2}{3}\pi} & -3\sqrt{5}*e^{j*\frac{2}{3}\pi} & \sqrt{5}*e^{j*\frac{2}{3}\pi} \\ 0 & 0 & 0 & 0 \\ 0 & 0 & 0 & 0 \\ -3\sqrt{5}*e^{j*\frac{1}{3}\pi} & -\sqrt{5}*e^{j*\frac{1}{3}\pi} & \sqrt{5}*e^{j*\frac{1}{3}\pi} & 3\sqrt{5}*e^{j*\frac{1}{3}\pi} \end{bmatrix} * P_{no}$ |
| UE 6 | $\begin{bmatrix} 0 & 0 & 0 & 0 \\ -\sqrt{5}*e^{j*\frac{1}{3}\pi} & 3\sqrt{5}*e^{j*\frac{1}{3}\pi} & -3\sqrt{5}*e^{j*\frac{1}{3}\pi} & \sqrt{5}*e^{j*\frac{1}{3}\pi} \\ -3 & -1 & 1 & 3 \\ 0 & 0 & 0 & 0 \end{bmatrix} * P_{no}$ |

NOTE:
$P_{no}$ is (M × M) normalized matrix for the power constraints.

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Here, $P_{no,m} = (1/|vec\ m|) \times \sqrt{K}$, for $m = 1, \ldots, M$, where $K = 4$, $M = 4$.

Embodiment 3: Optimization of Rules 1 and 4 and Relaxation of Rules 2 and 3 (Asymmetric Base Constellation Based Codebook Design)

In Embodiment 3, Rule 1 is optimized for the case where $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the case, if this factor graph is changed by a linear combination of each column vector or row vector thereof, its characteristics are not changed. To optimize Rule 4, the following single asymmetric base constellation and phase rotation are proposed.

Figure 14:
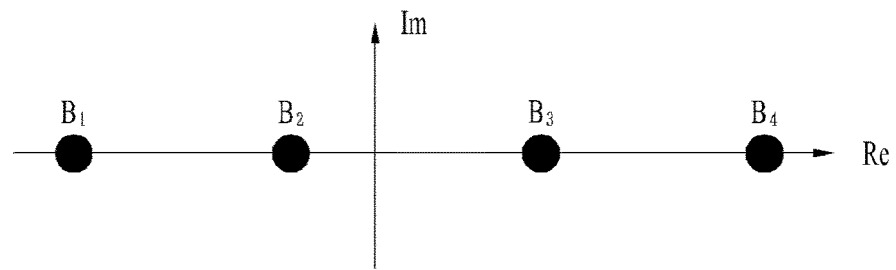
FIG. 14 is a diagram illustrating a single asymmetric base constellation

FIG. 14 illustrates a single asymmetric base constellation.

Referring to FIG. 14, it can be seen that Asymmetric Base Constellation: $B=[B_1, B_2, B_3, B_4]$, where $B_1=-4$, $B_2=-1$, $B_3=2$, $B_4=5$ and $$\text{Phase Rotation: } \theta_i = \frac{i-1}{d_f}*2\pi, \text{ where } i = 1, \ldots d_f.$$

Figure 15:
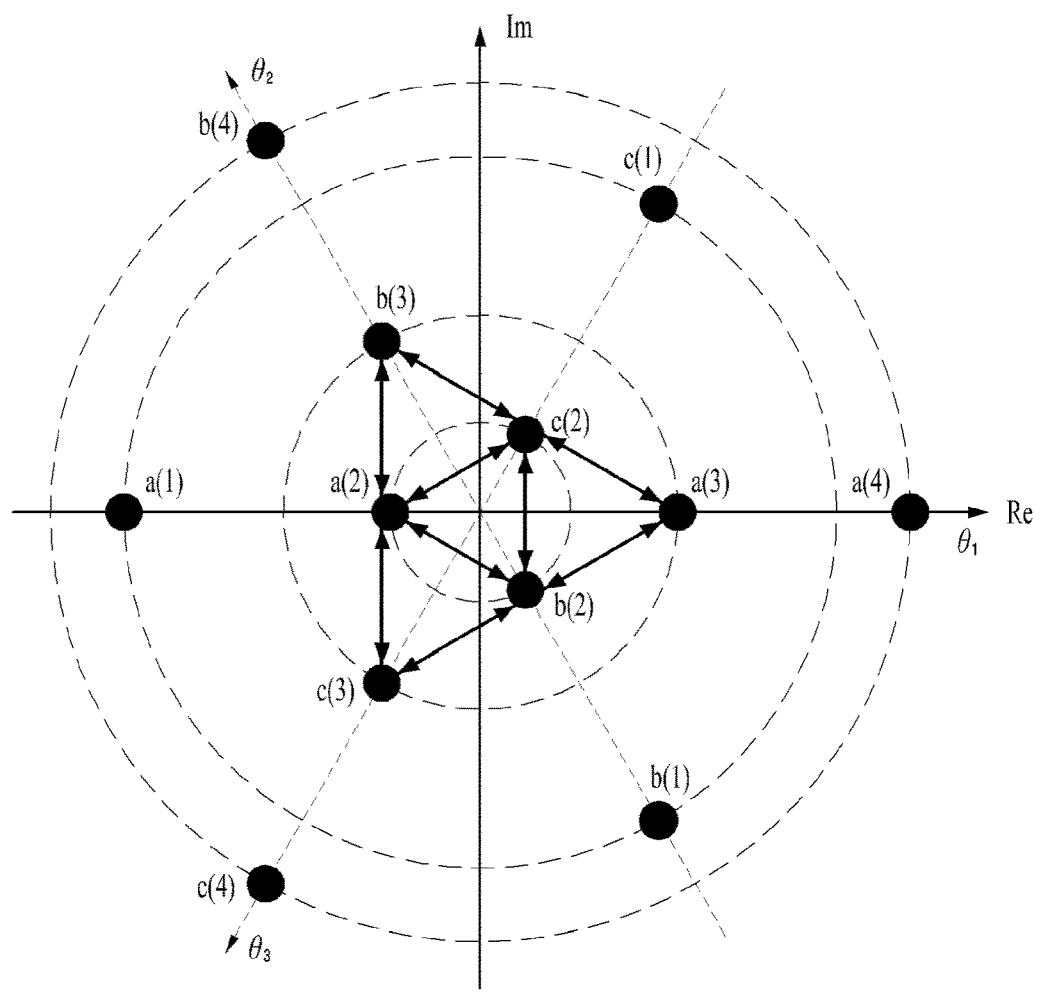
FIG. 15 is a diagram illustrating mother constellations according to FIG. 14.

Then, mother constellations may be configured by the asymmetric base constellation and phase rotation as shown in FIG. 15.

FIG. 15 illustrates mother constellations according to FIG. 14.

$a=B*\exp(j*\theta_1)=B=[a(1),a(2),a(3),a(4)]$     Mother Constellation 1

$b=B*\exp(j*\theta_2)=B*\exp(j*\frac{1}{3}\pi)=[b(1),b(2),b(3),b(4)]$     Mother Constellation 2

$e=B*\exp(j*\theta_3)=B*\exp(j*\frac{2}{3}\pi)=[c(1),c(2),c(3),c(4)]$.     Mother Constellation 3

That is, the Euclidean distance between the mother constellations is optimized. However, in this case, the Euclidean distance is not optimized for all constellations, but the Euclidean distance is optimized between the most dominant inner constellations when the constellations are configured using an ML approach. The Euclidean distance between constellations may be considered to be optimized if there is no constellation superposition on a single resource for multiple users.

For the optimization of Rule 2, the constellations may be mapped to the UE-specific codebook of each user as follows.

Since $F(UE=1) = \begin{bmatrix} 0 \\ 1 \\ 0 \\ 1 \end{bmatrix}$, UE specific Codebook 1 = $\begin{bmatrix} 0 \\ P*c^T \\ 0 \\ a \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=2) = \begin{bmatrix} 1 \\ 0 \\ 1 \\ 0 \end{bmatrix}$, UE specific Codebook 2 = $\begin{bmatrix} a \\ 0 \\ P*c^T \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=3) = \begin{bmatrix} 1 \\ 1 \\ 0 \\ 0 \end{bmatrix}$, UE specific Codebook 3 = $\begin{bmatrix} P*b^T \\ a \\ 0 \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=4) = \begin{bmatrix} 0 \\ 0 \\ 1 \\ 1 \end{bmatrix}$, UE specific Codebook 4 = $\begin{bmatrix} 0 \\ 0 \\ b \\ P*c^T \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=5) = \begin{bmatrix} 1 \\ 0 \\ 0 \\ 1 \end{bmatrix}$, UE specific Codebook 5 = $\begin{bmatrix} P*c^T \\ 0 \\ 0 \\ b \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=6) = \begin{bmatrix} 0 \\ 1 \\ 1 \\ 0 \end{bmatrix}$, UE specific Codebook 6 = $\begin{bmatrix} 0 \\ P*b^T \\ a \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

To improve the UE-specific codebook decoding performance of each user, the permutation matrix, P maximizes the Euclidean distance between complex vectors in the UE-specific codebook of each user according to Rule 2. For example, assuming that column vectors of $$UE \text{ specific Codebook } 1 = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix}$$

are vector 1, 2, 3, and 4, respectively, there is no phase reversal between vectors since c(1)≠−c(4), c(2)≠−c(3), a(1)≠−a(4), and a(2)≠−a(3). In addition, since conjugate(c(2))*c(4)+conjugate(a(1))*a(2)≠0 unlike Embodiment 1, vector 1 is non-orthogonal to vector 2. As a result, the UE-specific codebooks may not be optimized. However, each vector has a Euclidean distance close to a near-orthogonal relationship and a phase inverse relationship. By substituting the UE-specific codebooks into the factor graph for the bipartite matching obtained from Rule 1, Equation 9 is obtained.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix} \quad \text{[Equation 9]}$$

Meanwhile, in Rule 3, the superposition of constellations (i, j, k) may have a total of $M^{d_f}(4^3=64)$ combinations according to the mother constellations and the bipartite matching. However, the superposition of constellations may not be optimized as in Embodiment 1. The entire codebook may be summarized as shown in Equation 10.

$$F(K=4, J=6) = \quad \text{[Equation 10]}$$

$$\begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$a = [-4, -1, 2, 5]$, $b = [-4, -1, 2, 5] * \exp\left(j*\frac{2}{3}\pi\right)$, $c = [-4, -1, 2, 5] * \exp\left(j*\frac{4}{3}\pi\right)$, $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ UE specific Codebook $k = k^{th}$ column of $$F \text{ matrix} \left( \text{e.g., } UE \text{ specific Codebook } 1 = \right.$$

$$\left. 1^{st} \text{column of } F \text{ matrix} = \begin{bmatrix} 0 \\ P*c^T \\ 0 \\ a \end{bmatrix} \right)$$

Normalized codebook sets are represented as follows.

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 1 | $\begin{bmatrix} 0 & 0 & 0 & 0 \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \\ -4 & -1 & 2 & 5 \end{bmatrix} * P_{no}$ |
| UE 2 | $\begin{bmatrix} -4 & -1 & 2 & 5 \\ 0 & 0 & 0 & 0 \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \end{bmatrix} * P_{no}$ |
| UE 3 | $\begin{bmatrix} -1*e^{j*\frac{2}{3}\pi} & 5*e^{j*\frac{2}{3}\pi} & -4*e^{j*\frac{2}{3}\pi} & 2*e^{j*\frac{2}{3}\pi} \\ -4 & -1 & 2 & 5 \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ -4*e^{j*\frac{2}{3}\pi} & -1*e^{j*\frac{2}{3}\pi} & 2*e^{j*\frac{2}{3}\pi} & 5*e^{j*\frac{2}{3}\pi} \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \end{bmatrix} * P_{no}$ |
| UE 5 | $\begin{bmatrix} -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \\ 0 & 0 & 0 & 0 \\ -4*e^{j*\frac{2}{3}\pi} & -1*e^{j*\frac{2}{3}\pi} & 2*e^{j*\frac{2}{3}\pi} & 5*e^{j*\frac{2}{3}\pi} \end{bmatrix} * P_{no}$ |

-continued $$\text{UE specific Codebook } k = \begin{array}{cccc} 00 & 01 & 10 & 11 \\ [vec\ 1 & vec\ 2 & vec\ 3 & vec\ 4] \end{array} * P_{no}$$

| UE index k | |
|---|---|
| UE 6 | $\begin{bmatrix} 0 & 0 & 0 & 0 \\ -1*e^{j*\frac{2}{3}\pi} & 5*e^{j*\frac{2}{3}\pi} & -4*e^{j*\frac{2}{3}\pi} & 2*e^{j*\frac{2}{3}\pi} \\ -4 & -1 & 2 & 5 \\ 0 & 0 & 0 & 0 \end{bmatrix} * P_{no}$ |

NOTE:
$P_{no}$ is (M × M) normalized matrix for the power constraints, $$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Here, $P_{no,m} = (1/|vec\ m|) \times \sqrt{K}$, for m = 1, . . . , M, where K = 4, M = 4.

Embodiment 4: Optimization of Rules 1 and 4 and Relaxation of Rules 2 and 3 (Asymmetric 2D Base Constellation Based Codebook Design)

Rule 1 is optimized for the case where $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the case, if this factor graph is changed by a linear combination of each column vector or row vector thereof, its characteristics are not changed. To optimize Rule 4, the following asymmetric 2D base constellation and phase rotation are proposed.

Figure 16:
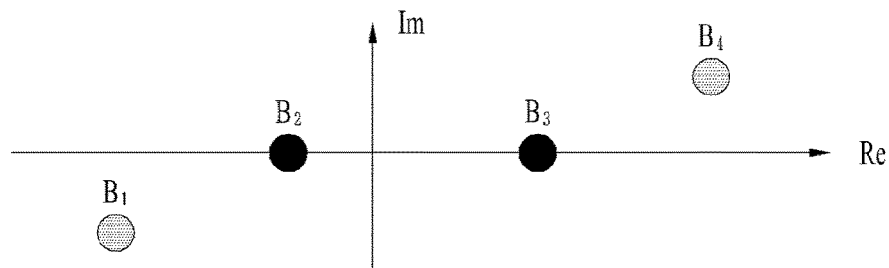
FIG. 16 is a diagram illustrating an asymmetric 2D base constellation

FIG. 16 illustrates an asymmetric 2D base constellation. In FIG. 16

Asymmetric 2D Base Constellation: $B = [B_1, B_2, B_3, B_4]$, where $B_1 = -2.5 - \frac{\sqrt{3}}{2}i,$ $B_2 = -1,$ $B_3 = 2,$ $B_4 = 3.5 + \frac{\sqrt{3}}{2}i,$ and Phase Rotation: $\theta_i = \frac{i-1}{d_f} * 2\pi$, where $i = 1, \ldots d_f$.

Then, mother constellations may be configured by the asymmetric 2D base constellation and phase rotation as follows.

Figure 17:
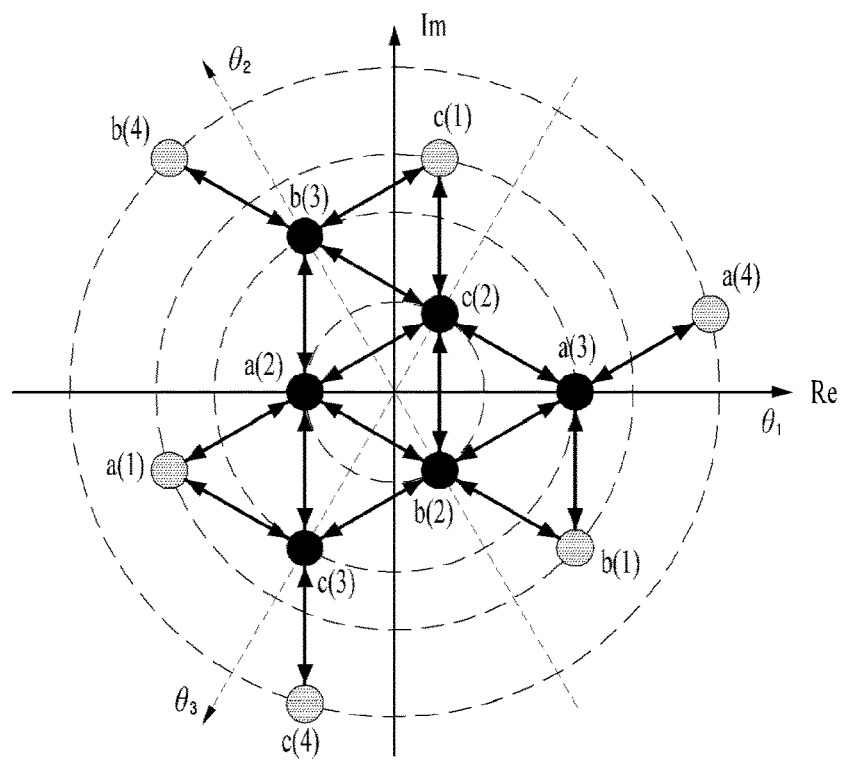
FIG. 17 is a diagram illustrating mother constellations according to FIG. 16.

FIG. 17 illustrates mother constellations according to FIG. 16.

$a=B^*\exp(j^*\theta_1)=B=[a(1),a(2),a(3),a(4)]$  Mother Constellation 1

$b=B^*\exp(j^*\theta_2)=B^*\exp(j^*\frac{1}{3}\pi)=[b(1),b(2),b(3)\text{Molfer}\text{ Constellation 2}$ $c=B^*\exp(j^*\theta_3)=B^*\exp(j^*\frac{2}{3}\pi)=[c(1),c(2),c(3),\text{Molfer}\text{ Constellation 3}$ That is, the Euclidean distance between the mother constellations is optimized. Unlike Embodiment 3, the Euclidean distance is optimized for all constellations. Specifically, the Euclidean distance is optimized for all constellations when the constellations are configured using an ML approach. The Euclidean distance between constellations may be considered to be optimized if there is no constellation superposition on a single resource for multiple users.

For the optimization of Rule 2, the constellations may be mapped to the UE-specific codebook of each user as follows.

Since $F(UE=1) = \begin{bmatrix} 0 \\ 1 \\ 0 \\ 1 \end{bmatrix}$, UE specific Codebook $1 = \begin{bmatrix} 0 \\ P*c^T \\ 0 \\ a \end{bmatrix},$ where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=2) = \begin{bmatrix} 1 \\ 0 \\ 1 \\ 0 \end{bmatrix}$, UE specific Codebook $2 = \begin{bmatrix} a \\ 0 \\ P*c^T \\ 0 \end{bmatrix},$ where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=3) = \begin{bmatrix} 1 \\ 1 \\ 0 \\ 0 \end{bmatrix}$, UE specific Codebook $3 = \begin{bmatrix} P*b^T \\ a \\ 0 \\ 0 \end{bmatrix},$ where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=4) = \begin{bmatrix} 0 \\ 0 \\ 1 \\ 1 \end{bmatrix}$, UE specific Codebook $4 = \begin{bmatrix} 0 \\ 0 \\ b \\ P*c^T \end{bmatrix},$ where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ Since $F(UE=5) = \begin{bmatrix} 1 \\ 0 \\ 0 \\ 1 \end{bmatrix}$, UE specific Codebook $5 = \begin{bmatrix} P*c^T \\ 0 \\ 0 \\ b \end{bmatrix},$ where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$ -continued Since $F(UE = 6) = \begin{bmatrix} 0 \\ 1 \\ 1 \\ 0 \end{bmatrix}$, UE specific Codebook 6 = $\begin{bmatrix} 0 \\ P*b^T \\ a \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

To improve the UE-specific codebook decoding performance of each user, the permutation matrix, P maximizes the Euclidean distance between complex vectors in the UE-specific codebook of each user according to Rule 2. For example, assuming that column vectors of $$UE \text{ specific Codebook } 1 = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix}$$

are vector 1, 2, 3, and 4, respectively, there is no phase reversal between vectors since c(1)≠−c(4), c(2)≠−c(3), a(1)≠−a(4), and a(2)≠−a(3). In addition, since conjugate(c(2))*c(4)+conjugate(a(1))*a(2)≠0 unlike Embodiment 1, vector 1 is non-orthogonal to vector 2. As a result, the UE-specific codebooks may not be optimized. However, each vector has a Euclidean distance close to a near-orthogonal relationship and a phase inverse relationship. By substituting the UE-specific codebooks into the factor graph for the bipartite matching obtained from Rule 1, Equation 11 is obtained.

$$F(K = 4, J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$ [Equation 11]

Meanwhile, in Rule 3, the superposition of constellations (i, j, k) may have a total of $M^{d_f}(4^3=64)$ combinations according to the mother constellations and the bipartite matching. However, the superposition of constellations may not be optimized as in Embodiment 1. The entire codebook may be summarized as follows.

$$F(K = 4, J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = \left[-2.5 - \frac{\sqrt{3}}{2}i, -1, 2, 3.5 + \frac{\sqrt{3}}{2}i\right],$$

$$b = \left[-2.5 - \frac{\sqrt{3}}{2}i, -1, 2, 3.5 + \frac{\sqrt{3}}{2}i\right] * \exp\left(j*\frac{2}{3}\pi\right),$$

$$c = \left[-2.5 - \frac{\sqrt{3}}{2}i, -1, 2, 3.5 + \frac{\sqrt{3}}{2}i\right] * \exp\left(j*\frac{4}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook $k = k^{th}$ column of $F$ matrix $$\left(\text{e.g., } UE \text{ specific Codebook } 1 = 1^{st} \text{ column of } F \text{ matrix} = \begin{bmatrix} 0 \\ P*c^T \\ 0 \\ a \end{bmatrix}\right)$$

In Rule 3, the superposition of constellations (i, j, k) may have a total of $M^{d_f}(4^3=64)$ combinations according to the mother constellations and the bipartite matching. However, the superposition of constellations may not be optimized as in Embodiment 1. The entire codebook may be summarized as follows.

Normalized codebook sets are represented as follows.

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 1 | $\begin{bmatrix} 0 & 0 & 0 & 0 \\ -1*e^{j*\frac{4}{3}\pi} & \left(3.5 + \frac{\sqrt{3}}{2}i\right)*e^{j*\frac{4}{3}\pi} & \left(-2.5 - \frac{\sqrt{3}}{2}i\right)*e^{j*\frac{4}{3}\pi} & 2*e^{j*\frac{4}{3}\pi} \\ 0 & 0 & 0 & 0 \\ -2.5 - \frac{\sqrt{3}}{2}i & -1 & 2 & 3.5 + \frac{\sqrt{3}}{2}i \end{bmatrix} * P_{no}$ |
| UE 2 | $\begin{bmatrix} -2.5 - \frac{\sqrt{3}}{2}i & -1 & 2 & 3.5 + \frac{\sqrt{3}}{2}i \\ 0 & 0 & 0 & 0 \\ -1*e^{j*\frac{4}{3}\pi} & \left(3.5 + \frac{\sqrt{3}}{2}i\right)*e^{j*\frac{4}{3}\pi} & \left(-2.5 - \frac{\sqrt{3}}{2}i\right)*e^{j*\frac{4}{3}\pi} & 2*e^{j*\frac{4}{3}\pi} \\ 0 & 0 & 0 & 0 \end{bmatrix} * P_{no}$ |

| UE index k | UE specific Codebook $k = \begin{matrix} 00 & 01 & 10 & 11 \end{matrix}$ $[vec\ 1\ \ vec\ 2\ \ vec\ 3\ \ vec\ 4] * P_{no}$ |
|---|---|
| UE 3 | $\begin{bmatrix} -1*e^{j*\frac{2}{3}\pi} & \left(3.5+\frac{\sqrt{3}}{2}i\right)*e^{j*\frac{2}{3}\pi} & \left(-2.5-\frac{\sqrt{3}}{2}i\right)*e^{j*\frac{2}{3}\pi} & 2*e^{j*\frac{2}{3}\pi} \\ -2.5-\frac{\sqrt{3}}{2}i & -1 & 2 & 3.5+\frac{\sqrt{3}}{2}i \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ \left(2.5-\frac{\sqrt{3}}{2}i\right)*e^{j*\frac{2}{3}\pi} & -1*e^{j*\frac{2}{3}\pi} & 2*e^{j*\frac{2}{3}\pi} & \left(3.5+\frac{\sqrt{3}}{2}i\right)*e^{j*\frac{2}{3}\pi} \\ -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \end{bmatrix} * P_{no}$ |
| UE 5 | $\begin{bmatrix} -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \\ 0 & 0 & 0 & 0 \\ 0 & 0 & 0 & 0 \\ \left(-2.5-\frac{\sqrt{3}}{2}i\right)*e^{j*\frac{2}{3}\pi} & -1*e^{j*\frac{2}{3}\pi} & 2*e^{j*\frac{2}{3}\pi} & \left(3.5+\frac{\sqrt{3}}{2}i\right)*e^{j*\frac{2}{3}\pi} \end{bmatrix} * P_{no}$ |
| UE 6 | $\begin{bmatrix} 0 & 0 & 0 & 0 \\ -1*e^{j*\frac{2}{3}\pi} & \left(3.5+\frac{\sqrt{3}}{2}i\right)*e^{j*\frac{2}{3}\pi} & \left(-2.5-\frac{\sqrt{3}}{2}i\right)*e^{j*\frac{2}{3}\pi} & 2*e^{j*\frac{2}{3}\pi} \\ -2.5-\frac{\sqrt{3}}{2}i & -1 & 2 & 3.5+\frac{\sqrt{3}}{2}i \\ 0 & 0 & 0 & 0 \end{bmatrix} * P_{no}$ |

NOTE:
$P_{no}$ is (M × M) normalized matrix for the power constraints, $$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Here, $P_{no,m} = (1/|vec\ m|) \times \sqrt{K}$, for m = 1, ..., M, where K = 4, M = 4.

Embodiment 5: Codebook Extension in Accordance with Rule 5

Hereinafter, a case in which the bipartite matching rule is extended to provide high connectivity will be described. As described in Rule 5, the factor graph of the bipartite matching obtained in Embodiment 1, 2, 3 or 4 is extended by the Cartesian product with an identity matrix.

For example, since $$F(K=8, J=12) = I_{2\times 2} \times F(K=4, J=6) = \begin{bmatrix} F(K=4, J=6) & 0 \\ 0 & F(K=4, J=6) \end{bmatrix}$$

may be extended as follows:

$$F(K=8, J=12) = \begin{bmatrix} 0 & a & P*b^T & 0 & P*c^T & 0 & 0 & 0 & 0 & 0 & 0 & 0 \\ P*c^T & 0 & a & 0 & 0 & P*b^T & 0 & 0 & 0 & 0 & 0 & 0 \\ 0 & P*c^T & 0 & b & 0 & a & 0 & 0 & 0 & 0 & 0 & 0 \\ a & 0 & 0 & P*c^T & b & 0 & 0 & 0 & 0 & 0 & 0 & 0 \\ 0 & 0 & 0 & 0 & 0 & 0 & 0 & a & P*b^T & 0 & P*c^T & 0 \\ 0 & 0 & 0 & 0 & 0 & 0 & P*c^T & 0 & a & 0 & 0 & P*b^T \\ 0 & 0 & 0 & 0 & 0 & 0 & 0 & P*c^T & 0 & b & 0 & a \\ 0 & 0 & 0 & 0 & 0 & 0 & a & 0 & 0 & P*c^T & b & 0 \end{bmatrix}.$$

Similarly, the following extension of $$F(mk, mJ) = I_{m \times m} \times F(K, J) = \begin{bmatrix} F(K,J) & \cdots & 0 \\ \vdots & \ddots & \vdots \\ 0 & \cdots & F(K,J) \end{bmatrix}$$

may be established.

By doing so, as the values of J and K increase, a larger factor graph may be used for the bipartite matching. In this case, although the decoding complexity of a receiving end may linearly increase, the factor graph of the bipartite matching may be extended without degradation of the decoding performance. The above-described codebook extension may be directly applied to Embodiment 1, 2, 3, or 4. When normalized codebook sets are configured, normalized values may be changed depending on the value of K.

Embodiment 6: Design of Codebook with K=6 and J=9 According to Embodiment 1, 2, 3 or 4

Regarding the above-described codebook design, Embodiment 1, 2, or 3 may be equally applied when $$F(K=6, J=9) = \begin{bmatrix} 1 & 1 & 1 & 0 & 0 & 0 & 0 & 0 & 0 \\ 1 & 0 & 0 & 1 & 1 & 0 & 0 & 0 & 0 \\ 0 & 1 & 0 & 1 & 0 & 1 & 0 & 0 & 0 \\ 0 & 0 & 0 & 0 & 1 & 0 & 1 & 1 & 0 \\ 0 & 0 & 1 & 0 & 0 & 0 & 1 & 0 & 1 \\ 0 & 0 & 0 & 0 & 0 & 1 & 0 & 1 & 1 \end{bmatrix},$$

$d_v=2$, and $d_f=3$ due to an increase in the value of K. However, in the case of K=6, the maximum factor graph for maintaining that $d_v=2$ is $$F(K=6, J=15) = \begin{bmatrix} 1 & 1 & 1 & 0 & 0 & 0 & 0 & 0 & 0 & 1 & 1 & 0 & 0 & 0 & 0 \\ 1 & 0 & 0 & 1 & 1 & 0 & 0 & 0 & 0 & 0 & 0 & 1 & 1 & 0 & 0 \\ 0 & 1 & 0 & 1 & 0 & 1 & 0 & 0 & 0 & 0 & 0 & 0 & 0 & 1 & 1 \\ 0 & 0 & 0 & 0 & 1 & 0 & 1 & 1 & 0 & 1 & 0 & 0 & 0 & 1 & 0 \\ 0 & 0 & 1 & 0 & 0 & 0 & 1 & 0 & 1 & 0 & 0 & 1 & 0 & 0 & 1 \\ 0 & 0 & 0 & 0 & 0 & 1 & 0 & 1 & 1 & 0 & 1 & 0 & 1 & 0 & 0 \end{bmatrix}$$

and $d_f=5$. Thus, the number of possibilities of selecting 9 column vectors from F(K=6, J=15) such that the condition of $d_f=3$ is satisfied may be various. However, it may be equally applied to Embodiment 1, 2, 3, or 4 regardless of which combination of column vectors is selected. Assuming that the codebook is designed such that $$F(K=6, J=9) = \begin{bmatrix} 1 & 1 & 1 & 0 & 0 & 0 & 0 & 0 & 0 \\ 1 & 0 & 0 & 1 & 1 & 0 & 0 & 0 & 0 \\ 0 & 1 & 0 & 1 & 0 & 1 & 0 & 0 & 0 \\ 0 & 0 & 0 & 0 & 1 & 0 & 1 & 1 & 0 \\ 0 & 0 & 1 & 0 & 0 & 0 & 1 & 0 & 1 \\ 0 & 0 & 0 & 0 & 0 & 1 & 0 & 1 & 1 \end{bmatrix},$$

the entire codebook may be designed using the base constellation and phase rotation illustrated in Embodiments 1 and 2 as shown in Equation 12.

$$F(K=6, J=9) = \begin{bmatrix} a & b & P*c^T & 0 & 0 & 0 & 0 & 0 & 0 \\ P*b^T & 0 & 0 & P*c^T & a & 0 & 0 & 0 & 0 \\ 0 & P*c^T & 0 & b & 0 & a & 0 & 0 & 0 \\ 0 & 0 & 0 & 0 & P*b^T & 0 & a & P*c^T & 0 \\ 0 & 0 & a & 0 & 0 & 0 & P*c^T & 0 & b \\ 0 & 0 & 0 & 0 & 0 & P*b^T & 0 & a & P*c^T \end{bmatrix}$$ [Equation 12]

The methods in Embodiments 1 to 4 may be represented as follows.

Method in Embodiment 1: $a = [-3, -1, 1, 3]$, $$b = [-3, -1, 1, 3] * \exp\left(j * \frac{3}{2}\pi\right),$$

$$c = [-3, -1, 1, 3] * \exp\left(j * \frac{2}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method in Embodiment 2: $a = [-3, -1, 1, 3]$, $$b = \left[-3*\sqrt{5}, -1*\sqrt{5}, 1*\sqrt{5}, 3*\sqrt{5}\right] * \exp\left(j * \frac{3}{2}\pi\right),$$

$$c = \left[-3*\sqrt{5}, -1*\sqrt{5}, 1*\sqrt{5}, 3*\sqrt{5}\right] * \exp\left(j * \frac{2}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method in Embodiment 3: $a = [-4, -1, 2, 5]$, $$b = [-4, -1, 2, 5] * \exp\left(j * \frac{2}{3}\pi\right),$$

$$c = [-4, -1, 2, 5] * \exp\left(j * \frac{3}{2}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method in Embodiment 4:

$$a = \left[-2.5 - \frac{\sqrt{3}}{2}i, -1, 2, 3.5 + \frac{\sqrt{3}}{2}i\right],$$

$$b = \left[-2.5 - \frac{\sqrt{3}}{2}i, -1, 2, 3.5 + \frac{\sqrt{3}}{2}i\right] * \exp\left(j * \frac{2}{3}\pi\right),$$

$$c = \left[-2.5 - \frac{\sqrt{3}}{2}i, -1, 2, 3.5 + \frac{\sqrt{3}}{2}i\right] * \exp\left(j * \frac{4}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook $k = k^{th}$ column of $F$ matrix e.g., UE specific Codebook $1 = 1^{st}$ column of $F$ matrix $= \left(\begin{bmatrix} a \\ P*b^T \\ 0 \\ 0 \\ 0 \\ 0 \end{bmatrix}\right)$

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 1 | $\begin{bmatrix} -3 & -1 & 1 & 3 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ 0 & 0 & 0 & 0 \\ 0 & 0 & 0 & 0 \\ 0 & 0 & 0 & 0 \\ 0 & 0 & 0 & 0 \end{bmatrix} * P_{no}$ |
| UE 2 | $\begin{bmatrix} -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ 0 & 0 & 0 & 0 \end{bmatrix} * P_{no}$ |
| UE 3 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ 0 & 0 & 0 & 0 \\ -3 & -1 & 1 & 3 \\ 0 & 0 & 0 & 0 \end{bmatrix} * P_{no}$ |
| UE 4 | $\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ 0 & 0 & 0 & 0 \\ 0 & 0 & 0 & 0 \\ 0 & 0 & 0 & 0 \end{bmatrix} * P_{no}$ |
| UE 5 | $\begin{bmatrix} 0 & 0 & 0 & 0 \\ -3 & -1 & 1 & 3 \\ 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ 0 & 0 & 0 & 0 \\ 0 & 0 & 0 & 0 \end{bmatrix} * P_{no}$ |
| UE 6 | $\begin{bmatrix} 0 & 0 & 0 & 0 \\ 0 & 0 & 0 & 0 \\ -3 & -1 & 1 & 3 \\ 0 & 0 & 0 & 0 \\ 0 & 0 & 0 & 0 \\ 1*e^{j*\frac{1}{3}\pi} & 3*e^{j*\frac{1}{3}\pi} & -3*e^{j*\frac{1}{3}\pi} & 1*e^{j*\frac{1}{3}\pi} \end{bmatrix} * P_{no}$ |
| UE 7 | $\begin{bmatrix} 0 & 0 & 0 & 0 \\ 0 & 0 & 0 & 0 \\ 0 & 0 & 0 & 0 \\ -3 & -1 & 1 & 3 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$ |

In Embodiment 1, the normalized codebook sets may be represented as follows.

| UE index k | UE specific Codebook $k = \begin{matrix} 00 & 01 & 10 & 11 \\ [vec\ 1 & vec\ 2 & vec\ 3 & vec\ 4] \end{matrix} * P_{no}$ |
|---|---|
| UE 8 | $\begin{bmatrix} 0 & 0 & 0 & 0 \\ 0 & 0 & 0 & 0 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$ |
| UE 9 | $\begin{bmatrix} 0 & 0 & 0 & 0 \\ 0 & 0 & 0 & 0 \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$ |

NOTE:
$P_{no}$ is (M × M) normalized matrix for the power constraints, $$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

Here, $P_{no,m} = (1/|vec\ m|) \times \sqrt{K}$, for $m = 1, \ldots, M$, where $K = 6$, $M = 4$.

Figure 18:
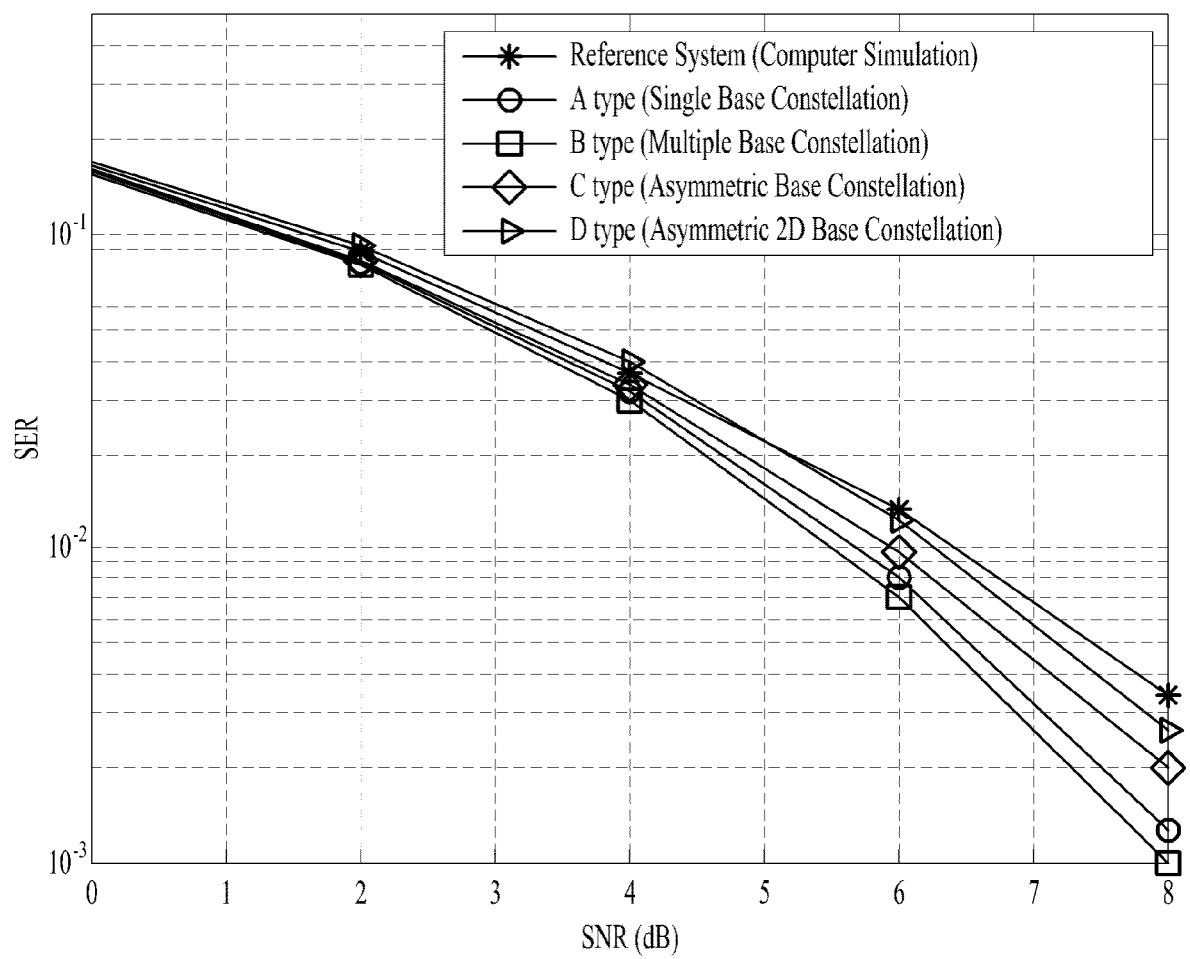
FIG. 18 is a diagram illustrating the performance of an MPA decoder according to Embodiments 1, 2, 3, and 4.

FIG. 18 illustrates the performance of an MPA decoder according to Embodiments 1, 2, 3, and 4.

In FIG. 18, the reference system corresponds to a result obtained by using a conventional codebook, and Types A, B, C, and D correspond to results obtained by using Embodiments 1, 2, 3, and 4, respectively. The result shows a symbol error rate (SER) in an additive white Gaussian noise (AWGN) environment in a multiuser superposition access system using the codebooks in Embodiments 1, 2, 3, and 4. It can be seen that the codebooks proposed in the present disclosure have better performance than predefined codebooks computed by computer simulation.

In all of the above-described embodiments, a codebook may be generated using not only a single embodiment but also a combination thereof. For example, a codebook may be designed based on asymmetric multiple base constellations obtained by combining the asymmetric base constellation of Embodiment 3 and the multiple base constellations of Embodiment 2. In all of the embodiments and examples, a codeword corresponding to a column vector of a codebook used by a transmitting end is normalized by transmission power. However, the codebook design methods described in the embodiments are not limited thereto. That is, other combination results (e.g., a linear combination of factor graphs, linear scaling of a mother constellation, etc.) may be obtained using the same design methods.

Signal Flow for MM-Based NOMA

Regarding the codebooks proposed in the above-described embodiments, a method of exchanging and signaling information on a codebook is required for MM-based NOMA. Accordingly, methods of exchanging and signaling information on a codebook for MM-based NOMA proposed in the codebook design embodiments will be described hereinafter.

Figure 19:
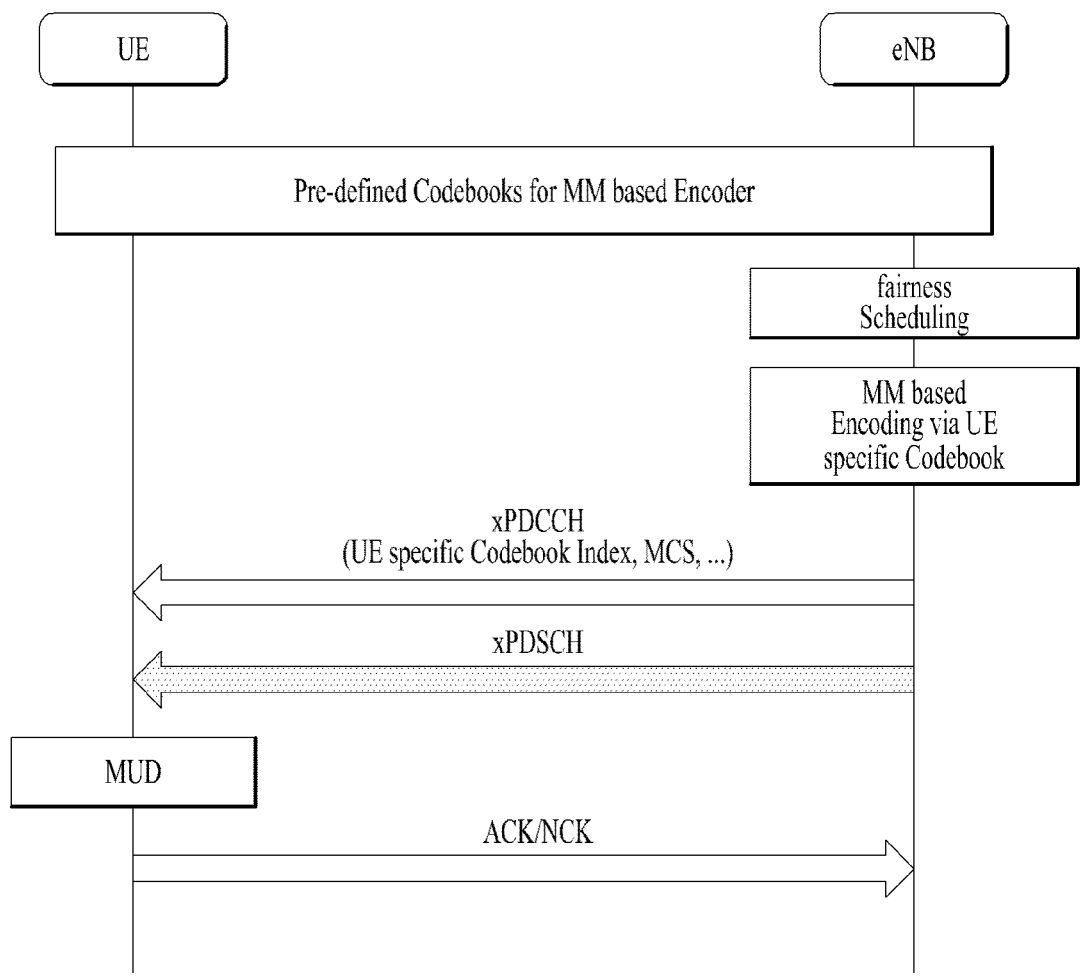
FIG. 19 is a diagram illustrating a method of exchanging and signaling information on a codebook for MM-based NOMA in downlink scheduling based transmission.
Figure 20:
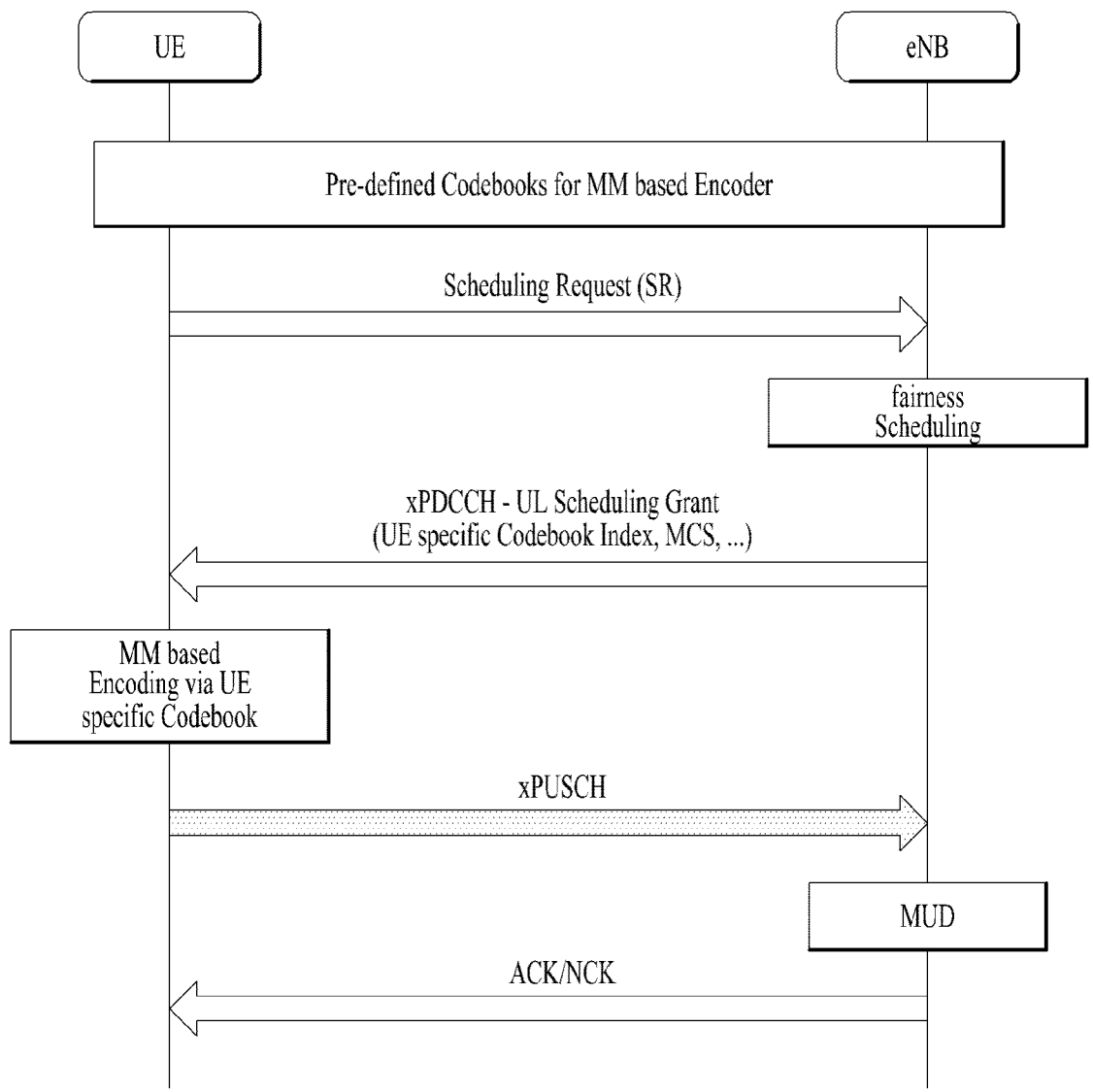
FIG. 20 is a diagram illustrating a method of exchanging and signaling information on a codebook for MM-based NOMA in uplink scheduling based transmission.

FIG. 19 illustrates a method of exchanging and signaling information on a codebook for MM-based NOMA in downlink scheduling based transmission, and FIG. 20 illustrates a method of exchanging and signaling information on a codebook for MM-based NOMA in uplink scheduling based transmission.

Referring to FIGS. 19 and 20, it can be seen that information on the index of a UE-specific codebook is signaled through control signaling or over a control channel. FIGS. 19 and 20 show downlink signal flow and uplink signal flow in an MM-based NOMA system, respectively. An eNB and a UE may have information on a predefined MM-based codebook set. The MM-based codebook set information may correspond to a set of UE-specific codebooks, and the codebooks proposed in the present disclosure may be used as the UE-specific codebooks. In this case, the eNB and UE may use various methods to have the information on the predefined MM-based codebook set. For example, 1) the eNB and UE may store the entirety of the MM-based codebook set predetermined therebetween by offline, or 2) the UE may receive the entirety of the MM-base codebook set through RRC signaling during an initial access procedure, an RRC procedure, etc.

Referring to FIG. 19, the eNB may perform MM-based encoding based on a UE-specific codebook (e.g., a specific codebook among the codebooks proposed in the present disclosure). The eNB may transmit to the UE a downlink control channel (e.g., xPDCCH) including information on a UE-specific codebook index, an MCS (modulation and coding scheme) index, and the like selected for the corresponding UE. In addition, the eNB may transmit to the corresponding UE a downlink data channel based on the downlink control channel. The UE may detect downlink data using a MUD scheme based on the information included in the received downlink control channel and then transmit ACK/NACK for the downlink data channel to the eNB.

Referring to FIG. 20, the eNB may transmit to the UE a downlink control channel (e.g., xPDCCH) including information on a UE-specific codebook index, an MCS index, and the like selected for the corresponding UE. The UE may perform MM-based encoding based on a UE-specific codebook (e.g., a specific codebook among the codebooks proposed in the present disclosure) and transmit an uplink data channel (e.g., xPUSCH) based on the received downlink control channel. The eNB may detect the uplink data channel using a MUD scheme and then transmit ACK/NACK for the uplink data channel to the UE.

Figure 21:
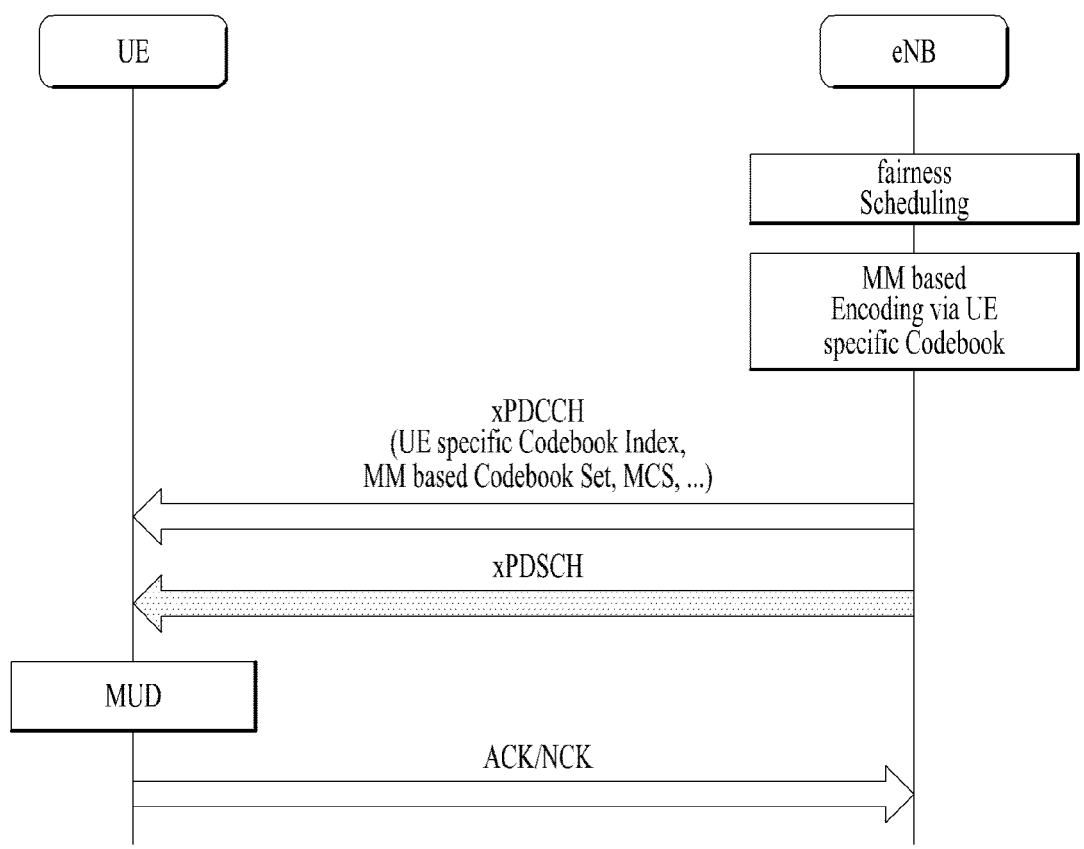
FIG. 21 is a diagram illustrating a method of exchanging and signaling information on a codebook for MM-based NOMA in downlink scheduling based transmission.
Figure 22:
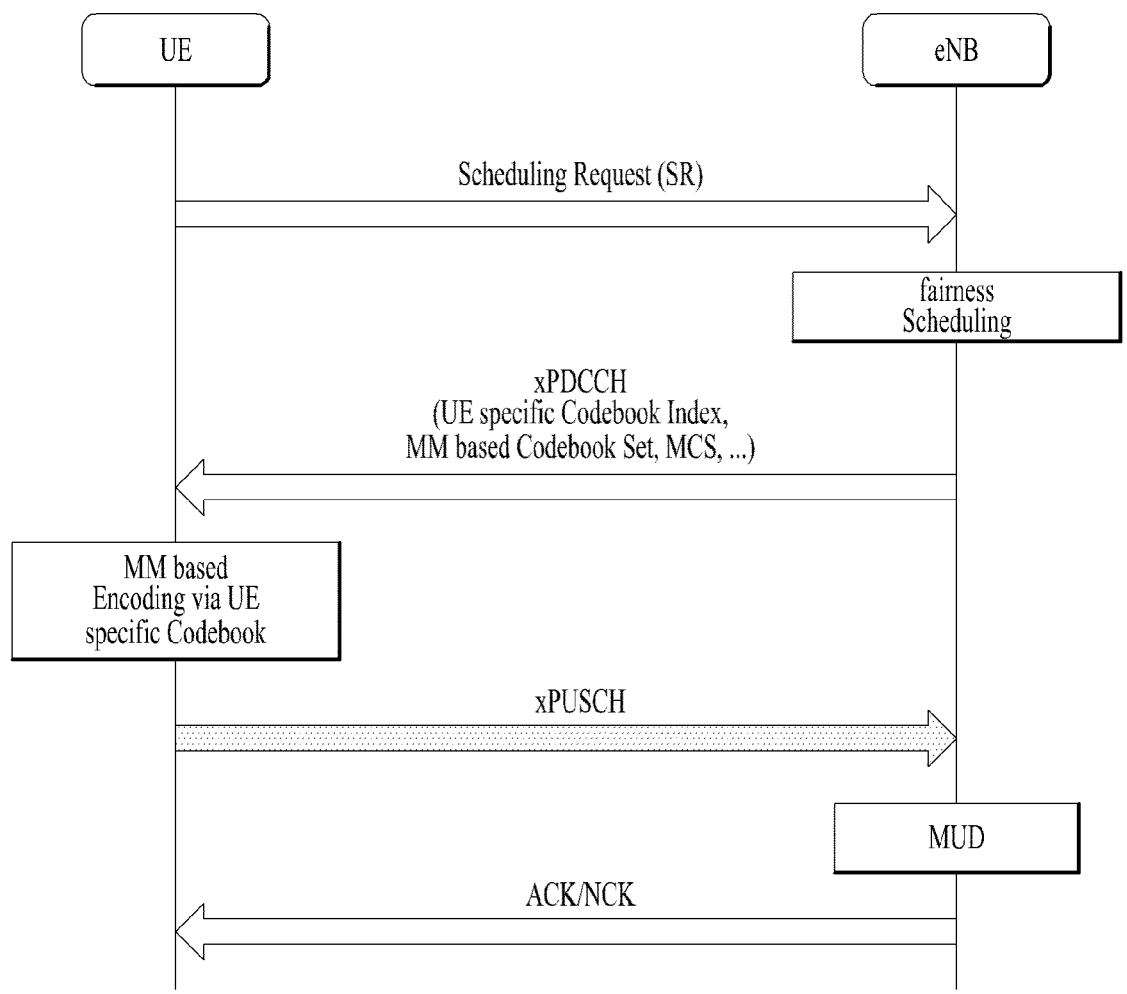
FIG. 22 is a diagram illustrating a method of exchanging and signaling information on a codebook for MM-based NOMA in uplink scheduling based transmission.

FIG. 21 illustrates a method of exchanging and signaling information on a codebook for MM-based NOMA in downlink scheduling based transmission, and FIG. 22 illustrates a method of exchanging and signaling information on a codebook for MM-based NOMA in uplink scheduling based transmission.

FIGS. 21 and 22 are different from FIGS. 19 and 20 in that the eNB transmits a UE-specific codebook index for the UE but also an entire MM-based codebook set over a downlink control channel. FIGS. 19 and 20 assume that the entire MM-based codebook set is shared by the eNB and UE through an initial access procedure or via RRC signaling, but FIGS. 21 and 22 assume that the entire MM-based codebook set is transmitted by the eNB to the UE over a downlink control channel.

When there is a request for downlink and uplink information transmission, an eNB transmits to a UE a codebook index corresponding to a UE-specific codebook to be used by the corresponding UE through fairness scheduling. The UE uses the UE-specific codebook for modulation or demodulation based on the received codebook index. In this case, the number of codebooks allocated to the corresponding UE may be one or two or more. Specifically, if the UE requires a high data transfer rate, two or more symbols may be simultaneously transmitted using two or more codebooks, and the two or more symbols may be demodulated by a receiving end. In addition, the values of J and K which determine the dimension of a codebook may be changed according to the system environment. The codebook that depends on the values of J and K may be generated or predefined according to the methods described in the codebook-related embodiments.

The eNB may perform resource management based on the fairness scheduling. That is, the eNB may determine an MCS level based on the value of MUI, which depends on the codebook characteristics, or an expected demodulation error rate. Then, the eNB may perform the fairness scheduling based on the determined MCS level.

Contention-Based Transmission

Figure 23:
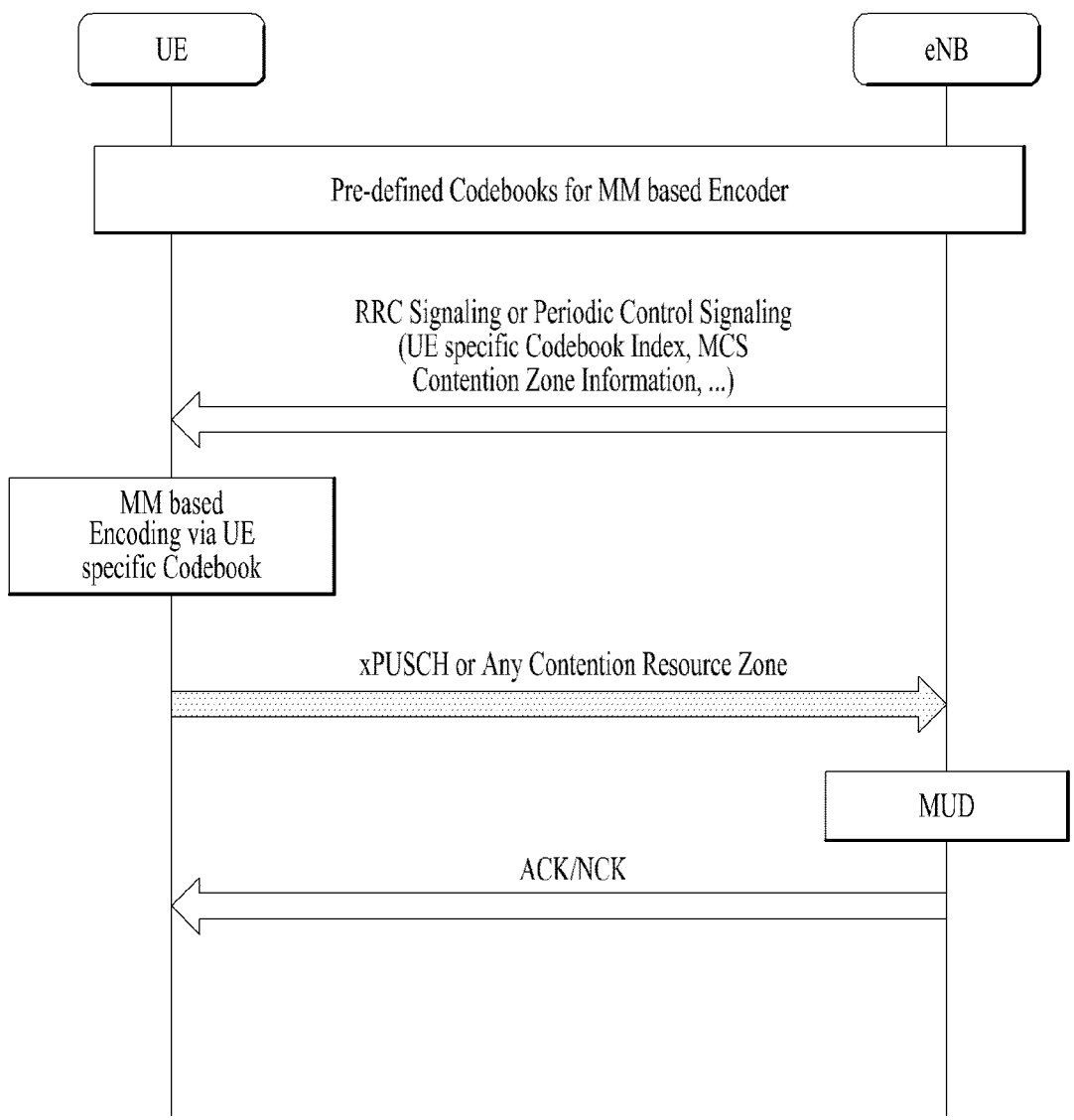
FIGS. 23 and 24 are diagrams illustrating contention-based transmission in an MM-based NOMA system. Specifically.
Figure 24:
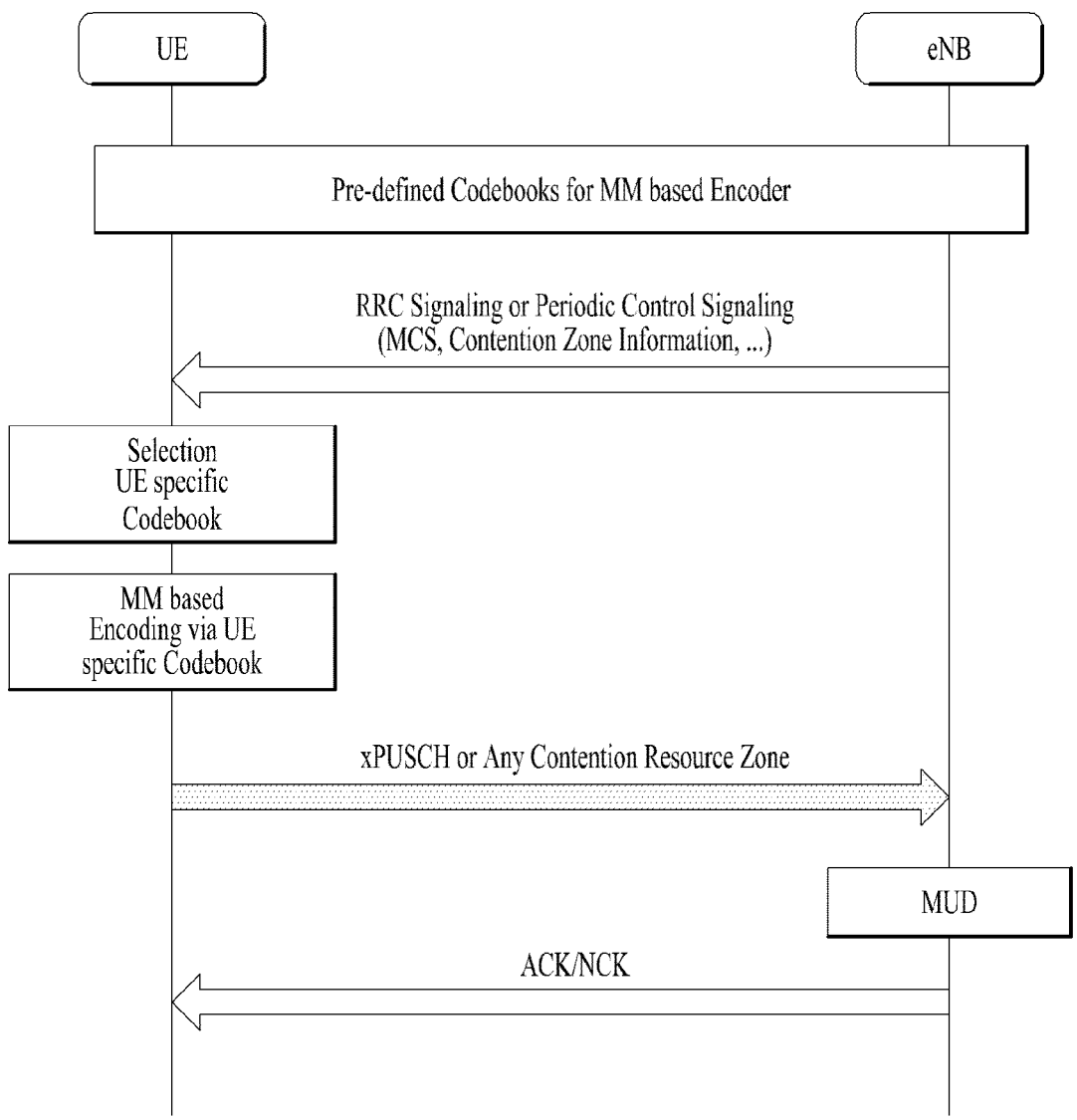

FIGS. 23 and 24 illustrate contention-based transmission in an MM-based NOMA system. Specifically, FIG. 23 illustrates signal flow in a contention-based transmission system based on UE-specific codebook allocation, and FIG. 24 illustrates signal flow in a contention-based transmission system based on UE-specific codebook selection.

FIG. 23 shows a case in which an eNB pre-allocates a UE-specific codebook for contention-based transmission in the MM-based NOMA system, and FIG. 24 shows a case in which a UE selects a UE-specific codebook for contention-based transmission in the MM-based NOMA system. In this case, the eNB and UE may have information on a predefined MM-based codebook set. The MM-based codebook set information may correspond to a set of UE-specific codebooks, and the codebooks proposed in the present disclosure may be used as the UE-specific codebooks. In addition, the eNB and UE may use various methods to have the information on the predefined MM-based codebook set. For example, 1) the eNB and UE may store the entirety of the MM-based codebook set predetermined therebetween by offline, or 2) the UE may receive the entirety of the MM-base codebook set through RRC signaling during an initial access procedure, an RRC procedure, etc.

In this case, the UE may receive information for contention-based transmission (e.g., an MCS, a contention resource zone, power control, etc. for the contention-based transmission) via RRC signaling or periodic control signaling. Referring to FIG. 23, the UE may receive from the eNB information on a UE-specific codebook index allocated for the corresponding UE, an MCS index (or MCS level), a contention zone for contention-based transmission, etc. The UE may perform MM-based encoding based on a UE-specific codebook corresponding to the UE-specific codebook index allocated for the UE. Thereafter, the UE may perform the contention-based transmission using an uplink data channel or a contention resource zone.

Referring to FIG. 24, when no UE-specific codebook index is pre-allocated, the UE may select a UE-specific codebook index according to a predetermined rule and perform MM-based encoding based on a UE-specific codebook corresponding to the selected UE-specific codebook index. Thereafter, the UE may perform contention-based transmission using an uplink data channel or a contention resource zone. To select a UE-specific codebook index, various methods such as (1) a method of selecting a random UE-specific codebook from a UE-specific codebook set and (2) a method of selecting a UE-specific codebook based on a UE-specific codebook index (k)=mod (C-RNTI(k), Maximum Codebook Index) may be used. The eNB may decode a received signal by performing MUD based on blind detection without knowing which UE transmits the signal in a contention zone. In this case, the eNB may know the UE that transmits the signal using a CRC check in the decoded signal and C-RNTI information in the decoded data.

Although the present disclosure is described based on DL transmission in a cellular system, the disclosure is also applicable to all systems using multiuser access technology, for example, UL transmission in the cellular system, machine type communication (MTC), device-to-device (D2D) communication, vehicle-to-everything (V2X) communication, etc. In addition, the codebook proposed in the present disclosure may be used for a multi-antenna communication system using MIMO characteristics. Alternatively, the codebook may be used as a codebook for multi-layer/hierarchical layer transmission in broadcasting. The above-described embodiments of the present disclosure correspond to combinations of the elements and features of the present disclosure. The elements or features may be considered to be selective unless otherwise mentioned. Each element or feature may be practiced without being combined with other elements or features. In addition, an embodiment of the present disclosure may be constructed by combining some of the elements and/or features. The sequences of operation in the embodiments of the present disclosure may be changed. The configurations or features of an embodiment may be included in another embodiment or replaced with the corresponding configurations or features of another embodiment. It is obvious to those skilled in the art that claims that are not explicitly cited in each other in the appended claims may be presented in combination as an embodiment of the present disclosure or included as a new claim by a subsequent amendment after the application is filed.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for performing MM-based NOMA communication and device therefor are industrially applicable to wireless communication systems such as the 3GPP LTE/LTE-A system, 5G system, etc.

The invention claimed is:

1. A method of performing, by a user equipment (UE), multi-dimensional modulation (MM) based non-orthogonal multiple access (NOMA) communication, the method comprising:
receiving control information on a codebook set predefined for an MM-based encoder and an index of a UE-specific codebook for the UE in the codebook set predefined for the MM-based encoder;
performing MM-based encoding based on the index of the UE-specific codebook; and
transmitting an uplink data channel after performing MM-based encoding,
wherein the codebook set includes a plurality of a UE-specific codebooks comprising the UE-specific codebook for the UE, and wherein the UE-specific codebook is configured such that a minimum Euclidean distance between any pair of complex column vectors in the UE-specific codebook is maximized.

2. The method of claim 1, wherein the codebook set is configured such that interference from multiple UEs caused by superposition access of the multiple UEs is minimized.

3. The method of claim 1, wherein the codebook set is configured such that when the base station performs decoding, complexity of a message passing algorithm (MPA) is minimized.

4. The method of claim 1, wherein the control information is received through a downlink control channel, radio resource control (RRC) signaling, or periodic control signaling.

5. The method of claim 1, wherein the control information further includes information on a modulation and coding scheme (MCS) index.

6. A method of performing, by a base station, multi-dimensional modulation (MM) based non-orthogonal multiple access (NOMA) communication, the method comprising:
selecting a user equipment (UE) specific codebook for a UE from a codebook set predefined for an MM-based encoder and performing MM-based encoding of channel-coded bits based on the selected UE-specific codebook;
transmitting, to the UE, control information including information on the codebook set predefined for the MM-based encoder and an index of the selected UE-specific codebook, wherein the MM-based encoding is applied to the control information; and
receiving, from the UE, an uplink data channel to which the MM-based encoding is applied based on the indicated UE-specific codebook,
wherein the codebook set includes a plurality of a UE-specific codebooks comprising the UE-specific codebook for the UE, and
wherein the UE-specific codebook is configured such that a minimum Euclidean distance between any pair of complex column vectors in the UE-specific codebook is maximized.

7. A user equipment (UE) for performing multi-dimensional modulation (MM) based non-orthogonal multiple access (NOMA) communication, the UE comprising:
a receiver;
a transmitter; and
a processor,
wherein the processor is configured to:
control the receiver to receive control information on a codebook set predefined for an MM-based encoder and an index of a UE-specific codebook for the UE in the codebook set predefined for the MM-based encoder;
perform MM-based encoding based on the index of the UE-specific codebook; and
control the transmitter to transmit an uplink data channel after performing MM-based encoding,
wherein the codebook set includes a plurality of a UE-specific codebooks comprising the UE-specific codebook for the UE, and
wherein the UE-specific codebook is configured such that a minimum Euclidean distance between any pair of complex column vectors in the UE-specific codebook is maximized.

8. The UE of claim 7, wherein the codebook set is configured such that interference from multiple UEs caused by superposition access of the multiple UEs is minimized.

9. The UE of claim 7, wherein the codebook set is configured such that when the base station performs decoding, complexity of a message passing algorithm (MPA) is minimized.

10. The UE of claim 7, wherein the control information is received through a downlink control channel, radio resource control (RRC) signaling, or periodic control signaling.

11. The UE of claim 7, wherein the control information further includes information on a modulation and coding scheme (MCS) index.

12. A base station for performing multi-dimensional modulation (MM) based non-orthogonal multiple access (NOMA) communication, the base station comprising:
a processor configured to:
select a user equipment (UE) specific codebook for a UE from a codebook set predefined for an MM-based encoder, and
perform MM-based encoding of channel-coded bits based on the selected UE-specific codebook;
a transmitter configured to transmit, to the UE, control information including information on the codebook set predefined for the MM-based encoder and an index of the selected UE-specific codebook, wherein the MM-based encoding is applied to the control information; and
a receiver configured to receive, from the UE, an uplink data channel to which the MM-based encoding is applied based on the indicated UE-specific codebook,
wherein the codebook set includes a plurality of a UE-specific codebooks comprising the UE-specific codebook for the UE, and
wherein the UE-specific codebook is configured such that a minimum Euclidean distance between any pair of complex column vectors in the UE-specific codebook is maximized.

* * * * *